(12) United States Patent
Raghavan et al.

(10) Patent No.: US 6,652,411 B2
(45) Date of Patent: Nov. 25, 2003

(54) MULTI-SPEED TRANSMISSION FAMILY WITH THREE PLANETARY GEAR SETS AND FIVE ROTATING TORQUE TRANSMITTING MECHANISMS

(75) Inventors: Madhusudan Raghavan, West Bloomfield, MI (US); Chi-Kuan Kao, Troy, MI (US); Patrick Benedict Usoro, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/963,881

(22) Filed: Sep. 26, 2001

(65) Prior Publication Data

US 2003/0060322 A1 Mar. 27, 2003

(51) Int. Cl.$^7$ .................................................. F16H 3/44
(52) U.S. Cl. ........................ 475/296; 276/280; 276/288
(58) Field of Search ................................ 475/296, 275, 475/286, 276, 280, 269, 288

(56) References Cited

U.S. PATENT DOCUMENTS

| | | | |
|---|---|---|---|
| 5,122,103 A | * 6/1992 | Nakawaki et al. | 475/278 |
| 5,616,093 A | * 4/1997 | Long et al. | 475/120 |
| 5,879,264 A | 3/1999 | Raghavan et al. | 475/280 |
| 5,997,429 A | 12/1999 | Raghavan et al. | 475/280 |
| 6,217,474 B1 | * 4/2001 | Ross et al. | 475/269 |
| 6,422,968 B1 | * 7/2002 | Coffey | 475/275 |
| 6,422,969 B1 | * 7/2002 | Raghavan et al. | 475/276 |
| 6,425,841 B1 | * 7/2002 | Haka | 475/275 |

FOREIGN PATENT DOCUMENTS

| | | |
|---|---|---|
| WO | 00/57081 | 9/2000 |
| WO | 00/57082 | 9/2000 |

* cited by examiner

*Primary Examiner*—Sherry Estremsky
*Assistant Examiner*—Tisha D. Lewis
(74) *Attorney, Agent, or Firm*—Kathryn A. Marra

(57) ABSTRACT

A family of transmissions wherein each family member has an input shaft, an output shaft, three planetary gear sets, and five rotating torque transmitting mechanisms (clutches). A first and second of the planetary gear sets have continuously interconnected first and second members through a interconnecting member, and the second members are continuously connected with a stationary housing. The third planetary gear set has a first member connected with the input shaft and a second member is connected with the output shaft. Five selectively engageable clutch mechanisms are interconnectable between members of the planetary gearsets, the input shaft, and the output shaft. The clutches are engaged in combinations of two to establish six forward speed ratios and one reverse ratio.

7 Claims, 13 Drawing Sheets

| | Ratios | 150 | 152 | 154 | 156 | 158 |
|---|---|---|---|---|---|---|
| Reverse | -2.13 | | X | | X | |
| Neutral | 0 | | | | X | |
| 1 | 4.18 | | | X | X | |
| 2 | 2.58 | | X | X | | |
| 3 | 1.51 | X | | X | | |
| 4 | 1 | X | X | | | |
| 5 | 0.75 | X | | | | X |
| 6 | 0.67 | X | | | X | |

(X=engaged clutch)

$\dfrac{\text{Ring Gear}}{\text{Sun Gear}}$ Tooth Ratio: $\dfrac{R_1}{S_1}=1.98$, $\dfrac{R_2}{S_2}=2.95$, $\dfrac{R_3}{S_3}=2.13$

| Ratio Spread | 6.26 |
|---|---|
| Ratio Steps | |
| Rev/1 | -0.51 |
| 1/2 | 1.62 |
| 2/3 | 1.72 |
| 3/4 | 1.51 |
| 4/5 | 1.34 |
| 5/6 | 1.12 |

| | Ratios | 250 | 252 | 254 | 256 | 258 |
|---|---|---|---|---|---|---|
| Reverse | -1.45 | | | | X | X |
| Neutral | 0 | | | | | |
| 1 | 2.84 | X | X | | | |
| 2 | 1.45 | X | | | X | |
| 3 | 1 | | | X | X | |
| 4 | 0.7 | X | | X | | |
| 5 | 0.58 | | | X | | X |
| 6 | 0.46 | X | | | | X |

(X=engaged clutch)

$\frac{\text{Ring Gear}}{\text{Sun Gear}}$ Tooth Ratio : $\frac{R_1}{S_1}=1.51$, $\frac{R_2}{S_2}=1.73$, $\frac{R_3}{S_3}=2.32$

| Ratio Spread | 6.19 |
|---|---|
| Ratio Steps | |
| Rev/1 | -0.51 |
| 1/2 | 1.96 |
| 2/3 | 1.45 |
| 3/4 | 1.43 |
| 4/5 | 1.21 |
| 5/6 | 1.26 |

| | Ratios | 350 | 352 | 354 | 356 | 358 |
|---|---|---|---|---|---|---|
| Reverse | -1.87 | X | | | X | |
| Neutral | 0 | | | | X | |
| 1 | 3.69 | | | | X | X |
| 2 | 2.58 | | | X | X | |
| 3 | 1.66 | | | X | | X |
| 4 | 1 | | X | X | | |
| 5 | 0.82 | | X | | | X |
| 6 | 0.64 | X | | | | X |

(X=engaged clutch)

$\frac{Ring\ Gear}{Sun\ Gear}$ Tooth Ratio: $\frac{R_1}{S_1} = 1.87$, $\frac{R_2}{S_2} = 1.83$, $\frac{R_3}{S_3} = 1.51$

| Ratio Spread | 5.78 |
|---|---|
| Ratio Steps | |
| Rev/1 | -0.51 |
| 1/2 | 1.43 |
| 2/3 | 1.55 |
| 3/4 | 1.66 |
| 4/5 | 1.22 |
| 5/6 | 1.29 |

| | Ratios | 450 | 452 | 454 | 456 | 458 |
|---|---|---|---|---|---|---|
| Reverse | -1.42 | | X | | | X |
| Neutral | 0 | | | | | |
| 1 | 2.71 | X | | | X | |
| 2 | 1.45 | X | | | | X |
| 3 | 1 | | | X | | X |
| 4 | 0.72 | X | | X | | |
| 5 | 0.6 | | X | X | | |
| 6 | 0.47 | X | X | | | |

(X=engaged clutch)

$\frac{\text{Ring Gear}}{\text{Sun Gear}}$ Tooth Ratio: $\frac{R_1}{S_1}=1.84$, $\frac{R_2}{S_2}=1.60$, $\frac{R_3}{S_3}=2.53$

| Ratio Spread | 5.75 |
|---|---|
| Ratio Steps | |
| Rev/1 | -0.52 |
| 1/2 | 1.87 |
| 2/3 | 1.45 |
| 3/4 | 1.4 |
| 4/5 | 1.2 |
| 5/6 | 1.27 |

| | Ratios | 550 | 552 | 554 | 556 | 558 |
|---|---|---|---|---|---|---|
| Reverse | -1.54 | X | | | X | |
| Neutral | 0 | | | | | |
| 1 | 2.77 | | | X | | X |
| 2 | 1.44 | | | | X | X |
| 3 | 1 | | X | | X | |
| 4 | 0.69 | | X | | | X |
| 5 | 0.57 | X | X | | | |
| 6 | 0.46 | X | | | | X |

(X=engaged clutch)

$\frac{\text{Ring Gear}}{\text{Sun Gear}}$ Tooth Ratio: $\frac{R_1}{S_1} = 1.54$, $\frac{R_2}{S_2} = 1.58$, $\frac{R_3}{S_3} = 2.23$

| Ratio Spread | 5.97 |
|---|---|
| Ratio Steps | |
| Rev/1 | -0.55 |
| 1/2 | 1.92 |
| 2/3 | 1.44 |
| 3/4 | 1.45 |
| 4/5 | 1.2 |
| 5/6 | 1.24 |

|  | Ratios | 650 | 652 | 654 | 656 | 658 |
|---|---|---|---|---|---|---|
| Reverse | -3.57 | X |  |  |  | X |
| Neutral | 0 |  |  |  |  | X |
| 1 | 3.96 |  |  |  | X | X |
| 2 | 2.81 | X |  |  | X |  |
| 3 | 1.63 |  | X |  | X |  |
| 4 | 1 | X | X |  |  |  |
| 5 | 0.74 | X |  | X |  |  |
| 6 | 0.65 |  | X | X |  |  |

(X=engaged clutch)

$\frac{\text{Ring Gear}}{\text{Sun Gear}}$ Tooth Ratio : $\frac{R_1}{S_1}=1.81$, $\frac{R_2}{S_2}=2.37$, $\frac{R_3}{S_3}=1.85$

| Ratio Spread | 6.11 |
|---|---|
| Ratio Steps |  |
| Rev/1 | -0.9 |
| 1/2 | 1.41 |
| 2/3 | 1.72 |
| 3/4 | 1.63 |
| 4/5 | 1.35 |
| 5/6 | 1.14 |

| | Ratios | 750 | 752 | 754 | 756 | 758 |
|---|---|---|---|---|---|---|
| Reverse | -4.01 | X | | | | X |
| Neutral | 0 | | | | | |
| 1 | 4.34 | | X | | X | |
| 2 | 2.33 | | X | | | X |
| 3 | 1.51 | X | X | | | |
| 4 | 1 | | X | X | | |
| 5 | 0.82 | X | | X | | |
| 6 | 0.66 | | | X | X | |
| 7 | 0.61 | | | X | | X |

(X=engaged clutch)

$\frac{Ring\ Gear}{Sun\ Gear}$ Tooth Ratio : $\frac{R_1}{S_1}=1.98$, $\frac{R_2}{S_2}=1.88$, $\frac{R_3}{S_3}=1.51$

| Ratio Spread | 6.55 (1/6) | 7.22 (1/7) |
|---|---|---|
| Ratio Steps | | |
| Rev/1 | -0.92 | -0.92 |
| 1/2 | 1.86 | 1.86 |
| 2/3 | 1.55 | 1.55 |
| 3/4 | 1.51 | 1.51 |
| 4/5 | 1.22 | 1.22 |
| 5/6 | 1.24 | 1.24 |
| 6/7 | - | 1.1 |

| | Ratios | 850 | 852 | 854 | 856 | 858 |
|---|---|---|---|---|---|---|
| Reverse | -3.37 | | X | X | | |
| Neutral | 0 | | | | | |
| 1 | 5.32 | | | | X | X |
| 2 | 2.54 | | | X | | X |
| 3 | 1.6 | | X | | | X |
| 4 | 1.21 | X | | | | X |
| 5 | 1 | X | X | | | |
| 6 | 0.72 | X | | | X | |
| 7 | 0.64 | X | | X | | |

(X=engaged clutch)

$\dfrac{\text{Ring Gear}}{\text{Sun Gear}}$ Tooth Ratio: $\dfrac{R_1}{S_1}=2.33$, $\dfrac{R_2}{S_2}=1.68$, $\dfrac{R_3}{S_3}=1.80$

| Ratio Spread | 7.39 (1/6) | 8.28 (1/7) |
|---|---|---|
| Ratio Steps | | |
| Rev/1 | -0.63 | -0.63 |
| 1/2 | 2.09 | 2.09 |
| 2/3 | 1.59 | 1.59 |
| 3/4 | 1.32 | 1.32 |
| 4/5 | 1.21 | 1.21 |
| 5/6 | 1.39 | 1.39 |
| 6/7 | - | 1.12 |

| | Ratios | 950 | 952 | 954 | 956 | 958 |
|---|---|---|---|---|---|---|
| Reverse | -2.84 | X | | | | X |
| Neutral | 0 | | | | | |
| 1 | 3.63 | | X | | X | |
| 2 | 2.24 | X | | | X | |
| 3 | 1.44 | | | | X | X |
| 4 | 1 | | | X | X | |
| 5 | 0.79 | | | X | | X |
| 6 | 0.61 | | X | X | | |
| 7 | 0.53 | X | | X | | |

(X=engaged clutch)

$\frac{Ring\ Gear}{Sun\ Gear}$ Tooth Ratio: $\frac{R_1}{S_1}=2.63$, $\frac{R_2}{S_2}=1.53$, $\frac{R_3}{S_3}=2.13$

| Ratio Spread | (1/6) 5.96 | (1/7) 6.85 |
|---|---|---|
| Ratio Steps | | |
| Rev/1 | -0.78 | -0.78 |
| 1/2 | 1.62 | 1.62 |
| 2/3 | 1.56 | 1.56 |
| 3/4 | 1.44 | 1.44 |
| 4/5 | 1.27 | 1.27 |
| 5/6 | 1.29 | 1.29 |
| 6/7 | -- | 1.15 |

| | Ratios | 1050 | 1052 | 1054 | 1056 | 1058 |
|---|---|---|---|---|---|---|
| Reverse | -2.82 | X | | X | | |
| Neutral | 0 | | | | | |
| 1 | 3.73 | | X | | | X |
| 2 | 2.28 | X | | | | X |
| 3 | 1.47 | | X | | | X |
| 4 | 1 | | | | X | X |
| 5 | 0.78 | | X | | X | |
| 6 | 0.61 | | X | | X | |
| 7 | 0.53 | X | | | X | |

(X=engaged clutch)

$\frac{\text{Ring Gear}}{\text{Sun Gear}}$ Tooth Ratio: $\frac{R_1}{S_1} = 1.53$, $\frac{R_2}{S_2} = 2.73$, $\frac{R_3}{S_3} = 1.89$

| Ratio Spread | (1/6) 6.14 | (1/7) 7.04 |
|---|---|---|
| Ratio Steps | | |
| Rev/1 | -0.76 | -0.76 |
| 1/2 | 1.63 | 1.63 |
| 2/3 | 1.55 | 1.55 |
| 3/4 | 1.47 | 1.47 |
| 4/5 | 1.28 | 1.28 |
| 5/6 | 1.28 | 1.28 |
| 6/7 | - | 1.15 |

| | Ratios | 1150 | 1152 | 1154 | 1156 | 1158 |
|---|---|---|---|---|---|---|
| Reverse | -1.53 | X | | X | | |
| Neutral | 0 | X | | | | |
| 1 | 2.84 | X | | | | X |
| 2 | 1.53 | | | X | | X |
| 3 | 1 | | | | X | X |
| 4 | 0.74 | | | X | X | |
| 5 | 0.58 | | X | | X | |
| 6 | 0.45 | X | | | X | |

(X=engaged clutch)

$\frac{Ring\ Gear}{Sun\ Gear}$ Tooth Ratio: $\frac{R_1}{S_1}=2.33,\quad \frac{R_2}{S_2}=1.73,\quad \frac{R_3}{S_3}=2.53$

| Ratio Spread | 6.25 |
|---|---|
| Ratio Steps | |
| Rev/1 | -0.54 |
| 1/2 | 1.86 |
| 2/3 | 1.53 |
| 3/4 | 1.34 |
| 4/5 | 1.29 |
| 5/6 | 1.28 |

| | Ratios | 1250 | 1252 | 1254 | 1256 | 1258 |
|---|---|---|---|---|---|---|
| Reverse | -1.93 | X | | | | X |
| Neutral | 0 | X | | | | |
| 1 | 3.72 | X | | X | | |
| 2 | 2.03 | | | X | | X |
| 3 | 1.35 | | | X | X | |
| 4 | 1 | | | | X | X |
| 5 | 0.7 | | X | | X | |
| 6 | 0.61 | X | | | X | |

(X=engaged clutch)

$\dfrac{\text{Ring Gear}}{\text{Sun Gear}}$ Tooth Ratio: $\dfrac{R_1}{S_1} = 2.08$, $\dfrac{R_2}{S_2} = 2.34$, $\dfrac{R_3}{S_3} = 1.93$

| Ratio Spread | 6.14 |
|---|---|
| Ratio Steps | |
| Rev/1 | -0.52 |
| 1/2 | 1.83 |
| 2/3 | 1.5 |
| 3/4 | 1.35 |
| 4/5 | 1.43 |
| 5/6 | 1.16 |

MULTI-SPEED TRANSMISSION FAMILY WITH THREE PLANETARY GEAR SETS AND FIVE ROTATING TORQUE TRANSMITTING MECHANISMS

TECHNICAL FIELD

This invention relates to multi-speed planetary transmissions for use in vehicles and more particularly to multi-speed planetary transmissions having six or more forward speed ratios.

BACKGROUND OF THE INVENTION

Passenger vehicles include a powertrain that is comprised of an engine, multi-speed transmission and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore, manually shifted (countershaft) transmissions were the most popular.

With the advent of three and four speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration. It has been suggested that the number of forward speed ratios be increased to five and even six speeds. This has been accomplished in many heavy truck powertrains. Six speed transmissions are disclosed in U.S. Pat. No. 4,070,927 issued to Polak on Jan. 31, 1978; U.S. Pat. No. 6,071,208 issued to Koivunen on Jun. 6, 2000, and U.S. Pat. No. 5,106,352 issued to Lepelletier on Apr. 21, 1992.

Six speed transmissions offer several advantages over four and five speed transmissions, including improved vehicle acceleration and improved fuel economy. While many trucks employ power transmissions, such as Polak, having six or more forward gear ratios, passenger cars are still manufactured with three and four speed automatic transmissions and relatively few five or six speed devices due to the size and complexity of these transmissions. The Polak transmission provides six forward speed ratios with three planetary gear sets, two clutches and three brakes. The Koivunen patent utilizes six torque transmitting devices including four brakes and two clutches to establish the six forward speed ratios and another reverse speed ratio. The Lepelletier employs three planetary gear sets, three clutches and two brakes to provide six forward speeds. One of the planetary gear sets is positioned and operated to establish two fixed speed input members for the remaining planetary gear sets.

SUMMARY OF THE INVENTION

It is an object of the present invention to provide an improved multi-speed transmission family wherein each family member has at least six forward speed ratios and one reverse speed ratio.

In one aspect of the present invention, the multi-speed transmissions have three planetary gear sets and five rotating torque transmitting mechanisms (clutches). In another aspect of the present invention each planetary gear set has three members comprised of a sun gear member, a ring gear member, and a planet carrier assembly member. In yet another aspect of the present invention, the first members of the first and second planetary gear sets are continuously interconnected by a first interconnecting member. In still another aspect of the present invention, the second members of the first and second planetary gear sets are continuously interconnected and also continuously connected with a stationary member of the transmission such as a housing by a second interconnecting member. In yet still another aspect of the present invention, an input shaft is continuously connected to one member of the third planetary gear set, and an output shaft is continuously connected with another member of the third planetary gear set. In yet still another aspect of the present invention each of the planetary gear sets have one non-continuously connected member.

In a further aspect of the present invention, the five torque transmitting mechanisms are selectively connectable in combinations of two to establish at least six forward speed ratios and one reverse speed ratio in the planetary gear sets between the input shaft and output shaft. A first of the torque transmitting mechanisms is selectively connectable between the third member of the first planetary gear set and a member of the third planetary gear set which may also be connected with the input shaft or the output shaft. In a yet further aspect of the present invention, a second of the torque transmitting mechanisms is selectively connectable between the first interconnecting member and a member of the third planetary gear set which may also be the member connected with the input shaft or the output shaft. In still a further aspect of the present invention, a third of the torque transmitting mechanisms is selectively connectable between one member of the third planetary gear set and one of the members of the first planetary gear set or the second planetary gear set. In a yet still further aspect of the present invention a fourth of the torque transmitting mechanisms is selectively connectable between the non-continuously connected member of the first planetary gear set or the second planetary gear set and a member of the third planetary gear set. In a yet still further aspect of the present invention, a fifth of the torque transmitting mechanisms is selectively connectable between one of the non-continuously connected members of the first planetary gear set or the second planetary gear set and a member of the third planetary gear set.

DESCRIPTION OF EXEMPLARY EMBODIMENTS

Figures 1, 2:
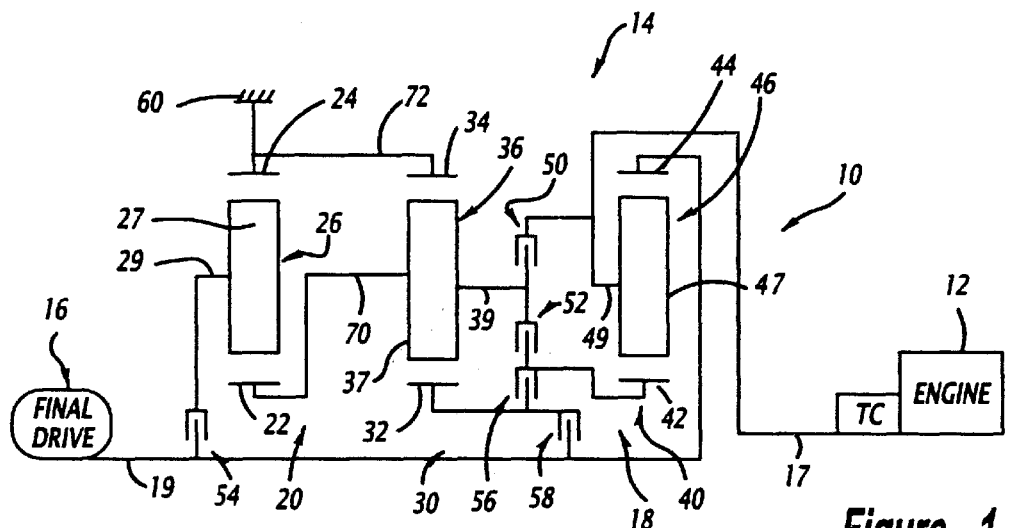
FIG. 1 is schematic representation of a powertrain incorporating one embodiment of the present invention.
FIG. 2 is a truth table and chart describing some of the operating characteristics of the powertrain depicted in FIG. 1.

A powertrain 10, shown in FIG. 1, includes a conventional engine and torque converter 12, a multi-speed planetary transmission 14, and a conventional final drive mechanism 16. The transmission 14 incorporates an input shaft 17, a planetary gear arrangement 18, and an output shaft 19. The input shaft 17 is connected with the engine and torque converter 12, and the output shaft 19 is connected with the final drive mechanism 16. The planetary gear arrangement has three simple planetary gear sets 20, 30, and 40; five rotating torque transmitting mechanisms (clutches) 50, 52, 54, 56, and 58; and two interconnecting members 70 and 72. The torque transmitting mechanisms 50, 52, 54, 56, and 58 are preferably conventional fluid-operated selectively engageable devices that are well known, in both design and operation, to those skilled in the art of transmission design and operation. The torque transmitting mechanisms are preferably controlled by a conventional electro-hydraulic control mechanism, not shown, that includes an electronic control module, which incorporates a programmable digital computer, and a hydraulic control that includes a conventional pump and control valves. The engagement and disengagement of the torque transmitting mechanisms is controlled by the electro-hydraulic control mechanism.

The planetary gear set 20 includes a sun gear member 22, a ring gear member 24, and a planet carrier assembly member 26 that has a carrier 29 on which is rotatably supported a plurality of pinion gears 27 disposed in meshing relation with the sun gear member 22 and the ring gear member 24. The planetary gear set 30 includes a sun gear member 32, a ring gear member 34, and a planet carrier assembly member 36 that has a carrier 39 on which is rotatably supported a plurality of pinion gears 37 disposed in meshing relation with the sun gear member 32 and the ring gear member 34. The planetary gear set 40 includes a sun gear member 42, a ring gear member 44, and a planet carrier assembly member 46 that has a carrier 49 on which is rotatably supported a plurality of pinion gears 47 disposed in meshing relation with the sun gear member 42 and the ring gear member 44.

The planet carrier assembly member 46 is continuously connected with the input shaft 17, and the ring gear member 44 is continuously connected with the output shaft 19. The sun gear member 22 and the planet carrier assembly member 36 are continuously interconnected by the interconnecting member 70. The ring gear member 24 and the ring gear member 34 are continuously interconnected by the interconnecting member 72 which is continuously connected with a stationary housing 60 of the transmission 14. The sun gear member 42, the sun gear member 32, and the planet carrier assembly member 26 are non-continuously connected with other gear members of the planetary gear arrangement 18. The torque transmitting mechanism 50 selectively interconnects the input shaft 17 and the planet carrier assembly member 46 with the interconnecting member 70, the planet carrier assembly member 36, and the sun gear member 22. The torque transmitting mechanism 52 selectively interconnects the sun gear member 42 with the interconnecting member 70, the planet carrier assembly member 36, and the sun gear member 22. The torque transmitting mechanism 54 selectively interconnects the planet carrier assembly member 26 with the output shaft 19 and the ring gear member 44. The torque transmitting mechanism 56 selectively interconnects the sun gear member 42 and the sun gear member 32. The torque transmitting mechanism 58 selectively interconnects the sun gear member 32 with the output shaft 19 and the ring gear member 44.

FIG. 2 depicts the engagement schedule and sample ratios for the planetary gear arrangement shown in FIG. 1. As can be seen, the torque transmitting mechanisms are engaged in combinations of two to establish six forward speed ratios and one reverse speed ratio. A neutral condition is also available. To establish the reverse speed ratio, the torque transmitting mechanisms 50 and 56 are selectively engaged. The torque transmitting mechanism 50 connects the planet carrier assembly member 46 and the input shaft 17 with the interconnecting member 70. The torque transmitting mechanism 56 connects the sun gear member 42 with the sun gear member 32. The planet carrier assembly member 36 and the sun gear member 22 are driven forwardly at the speed of the input shaft 17. The sun gear member 32 and the sun gear member 42 are driven forwardly at a speed determined by the speed of the planet carrier assembly member 36 and the ring gear/sun gear tooth ratio of the planetary gear set 30. The ring gear member 44 and the output shaft 19 are driven in reverse (opposite the input shaft 17) at a speed determined by the speed of the planet carrier assembly member 46, the speed of the sun gear member 42 and the ring gear/sun gear tooth ratio of the planetary gear set 40. The numerical value of the reverse speed ratio is determined by the ring gear/sun gear tooth ratios of the planetary gear sets 30 and 40.

The first forward speed ratio is established by the engagement of the torque transmitting mechanisms 54 and 56. The torque transmitting mechanism 56 can remain engaged during the neutral condition. The torque transmitting mechanism 54 connects the planet carrier assembly member 26 with the ring gear member 44 and the output shaft 19. The sun gear member 42 and the sun gear member 32 are driven forwardly at a speed determined by the speed of the planet carrier assembly member 46, the speed of the ring gear member 44 and the ring gear/sun gear tooth ratio of the planetary gear set 40. The planet carrier assembly member 36 and the sun gear member 22 are driven forwardly at a speed determined by the speed of the sun gear member 32 and the ring gear/sun gear tooth ratio of the planetary gear set 30. The planet carrier assembly member 26, the output shaft 19 and the ring gear member 44 are driven forwardly at a speed determined by the speed of the sun gear member 22 and the ring gear/sun gear tooth ratio of the planetary gear set 20. The ring gear member 44 is a rotating reaction member during the first speed ratio. The numerical value of the first forward speed ratio is determined by the ring gear/sun gear tooth ratios of the planetary gear sets 20, 30, and 40.

The second forward speed ratio is established with the selective engagement of the torque transmitting mechanisms 50 and 54. A one/two ratio interchange is a single transition interchange. The torque transmitting mechanism 50 selectively connects the planet carrier assembly member 36 and the sun gear member 22 with the planet carrier assembly member 46 and the input shaft 17. The sun gear member 22 is driven forwardly at the speed of the input shaft 17. The planet carrier assembly member 26 and the output shaft 19 are driven forwardly, at a reduced speed, determined by the speed of the sun gear member 22 and the ring gear/sun gear tooth ratio of the planetary gear set 20. The numerical value of the second forward speed ratio is determined by the ring gear/sun gear tooth ratio of the planetary gear set 20.

The third forward speed ratio is established by the selective engagement of the torque transmitting mechanisms 52 and 54. The two/three interchange is a single transition interchange. The torque transmitting mechanism 52 selectively interconnects the sun gear member 42 and the interconnecting member 70. The sun gear member 42, the planet carrier assembly member 36, and the sun gear member 22 are driven forwardly at a speed determined by the speed of the planet carrier assembly member 46, the speed of the ring gear member 44 and the ring gear/sun gear tooth ratio of the planetary gear set 40. The planet carrier assembly member 26, the output shaft 19 and the ring gear member 44 are driven forwardly at a speed determined by the speed of the sun gear member 22 and the ring gear/sun gear tooth ratio of the planetary gear set 20. The ring gear member 44 is a rotating reaction member during the third forward speed ratio. The numerical value of the third forward speed ratio is determined by the ring gear/sun gear tooth ratios of the planetary gear sets 40 and 20.

The fourth forward speed ratio is established by the engagement of the torque transmitting mechanism 50 and 52. The three/four interchange is a single transition interchange. The torque transmitting mechanisms 50 and 52, when engaged connect the input shaft 17 and the planet carrier assembly member 46 with the sun gear member 42. This places the planetary gear set 40 in a direct drive condition wherein the input shaft 17 and the output shaft 19 are rotated at the same speed. The fourth forward speed ratio is a one-to-one ratio.

The fifth forward speed ratio is established with the engagement of the torque transmitting mechanisms 52 and 58. The four/five interchange is a single transition interchange. The torque transmitting mechanism 58 selectively interconnects the sun gear member 32, the ring gear member 44, and the output shaft 19. The sun gear member 42 and the planet carrier assembly member 36 are driven forwardly at a speed determined by the speed of the planet carrier assembly member 46, the speed of the ring gear member 44, and the ring gear/sun gear tooth ratio of the planetary gear set 40. The sun gear member 32, the ring gear member 44 and the output shaft 19 are driven forwardly at an increased speed determined by the speed of the planet carrier assembly member 36 and the toothed ratio of the planetary gear set 30. The ring gear member 44 is a rotating reaction member during the fifth forward speed ratio, the numerical value of which is determined by the toothed ratios of the planetary gear sets 30 and 40.

The sixth forward speed ratio is determined by the engagement of the torque transmitting mechanisms 52 and 56. The five/six interchange is a single transition interchange. The engagement of the torque transmitting mechanisms 52 and 56 effectively connect the sun gear member 32 and the sun gear member 42 with the transmission housing 60. The ring gear member 44 and the output shaft 19 are rotated forwardly at an increased speed determined by the speed of the input shaft 17, the speed of the planet carrier assembly member 46, and the ring gear/sun gear tooth ratio of the planetary gear set 40. The numerical value of the sixth forward speed ratio is determined by the ring gear/sun gear tooth ratio of the planetary gear set 40.

The truth table shown in FIG. 2 defines the torque transmitting mechanism engagement required for each of the forward speed ratios and the reverse speed ratio. As shown in FIG. 2, the torque transmitting mechanism 50, 52, 54, 56, and 58 are engaged in combinations of two to establish six forward speed ratios and a reverse speed ratio between the input shaft 17 and the output shaft 19. The truth table also indicates that the torque transmitting mechanism 56 can remain engaged during the neutral condition thereby simplifying the first/reverse interchange. The numerical values for the ratios have been determined using the ring gear/sun gear tooth ratios given in FIG. 2. The R1/S1 value is the ring gear/sun gear tooth ratio of the planetary gear set 20, the R2/S2 value is the ring gear/sun gear tooth ratio of the planetary gear set 30, and the R3/S3 value is the ring gear/sun gear tooth ratio of the planetary gear set 40. As can be determined from the truth table, the single ratio interchanges for the forward speed ratios are single transition interchanges. Also, double step interchanges such as $1^{st}$ to $3^{rd}$, $2^{nd}$ to $4^{th}$, $3^{rd}$ to $5^{th}$, and $4^{th}$ to $6^{th}$ are single transition interchanges. FIG. 2 also describes the step ratio between adjacent ratios; for example, the numerical step between $1^{st}$ and $2^{nd}$ is 1.41.

Figures 3, 4:
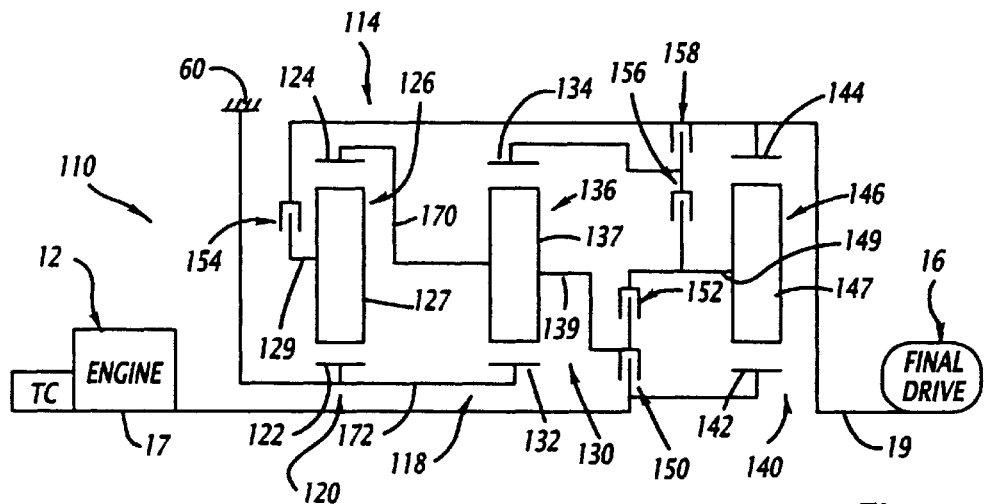
FIG. 3 is schematic representation of a powertrain incorporating another embodiment of the present invention.
FIG. 4 is a truth table and chart describing some of the operating characteristics of the powertrain depicted in FIG. 3.

A powertrain 110, shown in FIG. 3, includes the engine and torque converter 12, a planetary transmission 114, and the final drive mechanism 16. The planetary transmission 114 incorporates the input shaft 17, a planetary gear arrangement 118, and the output shaft 19. The planetary gear arrangement includes three simple planetary gear sets 120, 130, and 140, two continuous interconnecting members 170 and 172, and five torque transmitting mechanisms 150, 152, 154, 156, and 158. The planetary gear set 120 includes a sun gear member 122, a ring gear member 124, and a planet carrier assembly member 126 which incorporates a plurality of pinion gears 127 that are rotatably mounted on a carrier 129 and disposed in meshing relation with the sun gear member 122 and the ring gear member 124. The planetary gear set 130 includes a sun gear member 132, a ring gear member 134, and a planet carrier assembly member 136 which incorporates a plurality of pinion gears 137 that are rotatably mounted on a carrier 139 and disposed in meshing relation with the sun gear member 132 and the ring gear member 134. The planetary gear set 140 includes a sun gear member 142, a ring gear member 144, and a planet carrier assembly member 146 which incorporates a plurality of pinion gears 147 that are rotatably mounted on a carrier 149 and disposed in meshing relation with the sun gear member 142 and the ring gear member 144.

The input shaft 17 is continuously connected with the sun gear member 140, and the output shaft 19 is continuously connected with the ring gear member 144. The ring gear member 122 and the planet carrier assembly member 136 are continuously interconnected by the interconnecting member 170, and the sun gear member 122 and the sun gear member 132 are continuously interconnected by the interconnecting member 172 with the housing 60. The planet carrier assembly member 126, the ring gear member 134 and the planet carrier assembly member 146 are non-continuously connected with other members of the planetary gear sets. The torque transmitting mechanism 150 selectively interconnects the input shaft 17 and the sun gear member 142 with the interconnecting member 170. The torque transmitting mechanism 152 selectively interconnects the planet carrier assembly member 146 with the interconnecting member 170. The torque transmitting mechanism 154 selectively interconnects the planet carrier assembly member 126 with the ring gear member 144 and the output shaft 19. The torque transmitting mechanism 156 selectively interconnects the planet carrier assembly member 146 with the ring gear member 134. The torque transmitting mechanism 158 selectively interconnects the ring gear member 144 and the output shaft 19 with the ring gear member 134. The torque transmitting mechanisms 150, 152, 154, 156, and 158 are selectively engaged in combinations of two to establish six forward speed ratios and one reverse speed ratio between the input shaft 17 and the output shaft 19.

The reverse speed ratio is established by the engagement of the torque transmitting mechanisms 152 and 156. The torque transmitting mechanism 152 selectively interconnects the planet carrier assembly member 146 with the interconnecting member 170, and the torque transmitting mechanism 156 selectively interconnects the planet carrier assembly member 146 with the ring gear member 134. This effectively connects the planet carrier assembly member 146 with the transmission housing 60. The sun gear member 142 is driven forwardly by the input shaft 17. The ring gear member 144 is driven in reverse at a speed determined by the speed of the sun gear member 142 and the ring gear/sun gear tooth ratio of the planetary gear set 140.

The first forward speed ratio is established by the engagement of the torque transmitting mechanisms 154 and 156. The torque transmitting mechanism 156 can remain engaged during a reverse to first interchange while the transmission passes through a neutral condition. The torque transmitting mechanism 154 selectively interconnects the ring gear member 144 and the output shaft 19 with the planet carrier assembly member 126. The planet carrier assembly member 146 and the ring gear member 134 are driven forwardly at a speed determined by the speed of the sun gear member 142, the speed of the ring gear member 144, and the ring gear/sun gear tooth ratio of the planetary gear set 140. The planet carrier assembly member 136 and the ring gear member 124 are driven forwardly at a speed determined by the speed of the ring gear member 134 and the ring gear/sun gear tooth ratio of the planetary gear set 130. The planet carrier assembly member 126, the ring gear member 144, and the output shaft 19 are driven forwardly at a reduced speed determined by the speed of the ring gear member 124 and the ring gear/sun gear tooth ratio of the planetary gear set 120. The ring gear member 144 is a rotating reaction member during the first forward speed ratio. The numerical value of the first forward speed ratio is determined by the ring/sun tooth ratio of the planetary gear sets 120, 130, and 140.

The second forward speed ratio is established by the engagement of the torque transmitting mechanisms 152 and 154. The one/two interchange is a single transition interchange. The planet carrier assembly member 146 and the ring gear member 124 are driven forwardly at a speed determined by the speed of the sun gear member 142, the speed of the ring gear member 144 and the ring gear/sun gear tooth ratio of the planetary gear set 140. The planet carrier assembly member 126, the ring gear member 144, and the output shaft 19 are driven forwardly at a reduced speed determined by the speed of the ring gear member 124 and the ring gear/sun gear tooth ratio of the planetary gear set 120. The ring gear member 144 is a rotating reaction member during this ratio. The numerical value of the second forward speed ratio is determined by the ring gear/sun gear tooth ratios of the planetary gear sets 120 and 140.

The third forward speed ratio is established by the selective engagement of the torque transmitting mechanisms 150 and 154. The two/three interchange is a single transition interchange. The torque transmitting mechanism 150 selectively interconnects the input shaft 17 and the sun gear member 142 with the interconnecting member 170. The ring gear member 124 is rotated forwardly at the speed of the input shaft 17. The planet carrier assembly member 126, the ring gear member 144, and the output shaft 19 are driven forwardly at a reduced speed determined by the speed of the ring gear member 124 and the ring gear/sun gear tooth ratio of the planetary gear set 120. The numerical value of the third forward speed ratio is determined by the ring gear/sun gear tooth ratio of the planetary gear set 120.

The fourth forward speed ratio is established with the selective engagement of the torque transmitting mechanisms 150 and 152. This connects the sun gear member 142 and the input shaft 17 with the planet carrier assembly member 146 and places the planetary gear set 140 in a direct drive condition wherein both the input shaft 17 and the output shaft 19 are rotated at the speed of the input shaft 17. The fourth forward speed ratio is a one-to-one ratio. The three/four interchange is a single transition interchange.

The fifth forward speed ratio is established with the selective engagement of the torque transmitting mechanisms 150 and 158. The four/five interchange is a single transition interchange. The torque transmitting mechanism 158 selectively interconnects the ring gear member 134 with the ring gear member 144 and the output shaft 19. The planet carrier assembly member 136 is rotated at the speed of the input shaft 17. The ring gear member 134 and the output shaft 19 are rotated forwardly at an increased speed determined by the speed of the planet carrier assembly member 136 and the ring gear/sun gear tooth ratio of the planetary gear set 130. The numerical value of the fifth forward speed ratio is determined by the ring gear/sun gear tooth ratio of the planetary gear set 130.

The sixth forward speed ratio is established by the engagement of the torque transmitting mechanisms 150 and 156. The five/six interchange is a single transition interchange. The ring gear member 134 and the planet carrier assembly member 146 are driven forwardly at an increased speed determined by the speed of the planet carrier assembly member 136 and the ring gear/sun gear tooth ratio of the planetary gear set 130. The ring gear member 144 and the output shaft 19 are driven forwardly at an increased speed determined by the speed of the planet carrier assembly member 146, the speed of the sun gear member 142, and the ring gear/sun gear tooth ratio of the planetary gear set 140. The numerical value of the sixth forward speed ratio is determined by the ring gear/sun gear tooth ratios of the planetary gear sets 130 and 140.

The truth table shown in FIG. 4 defines the torque transmitting mechanism engagement required for each of the forward speed ratios and the reverse speed ratio. As shown in FIG. 4, the torque transmitting mechanism 150, 152, 154, 156, and 158 are engaged in combinations of two to establish six forward speed ratios and a reverse speed ratio between the input shaft 17 and the output shaft 19. The truth table also indicates that the torque transmitting mechanism 156 can remain engaged during the neutral condition thereby simplifying the first/reverse interchange. The numerical values for the ratios have been determined using the ring gear/sun gear tooth ratios given in FIG. 4. The R1/S1 value is the ring gear/sun gear tooth ratio of the planetary gear set 120, the R2/S2 value is the ring gear/sun gear tooth ratio of the planetary gear set 130, and the R3/S3 value is the ring gear/sun gear tooth ratio of the planetary gear set 140. As can be determined from the truth table, the single ratio interchanges for the forward speed ratios are single transition interchanges. Also, double step interchanges such as $1^{st}$ to $3^{rd}$, $2^{nd}$ to $4^{th}$, $3^{rd}$ to $5^{th}$, and $4^{th}$ to $6^{th}$ are single transition interchanges. FIG. 4 also describes the step ratio between adjacent ratios; for example, the numerical step between $1^{st}$ and $2^{nd}$ is 1.62.

Figures 5, 6:
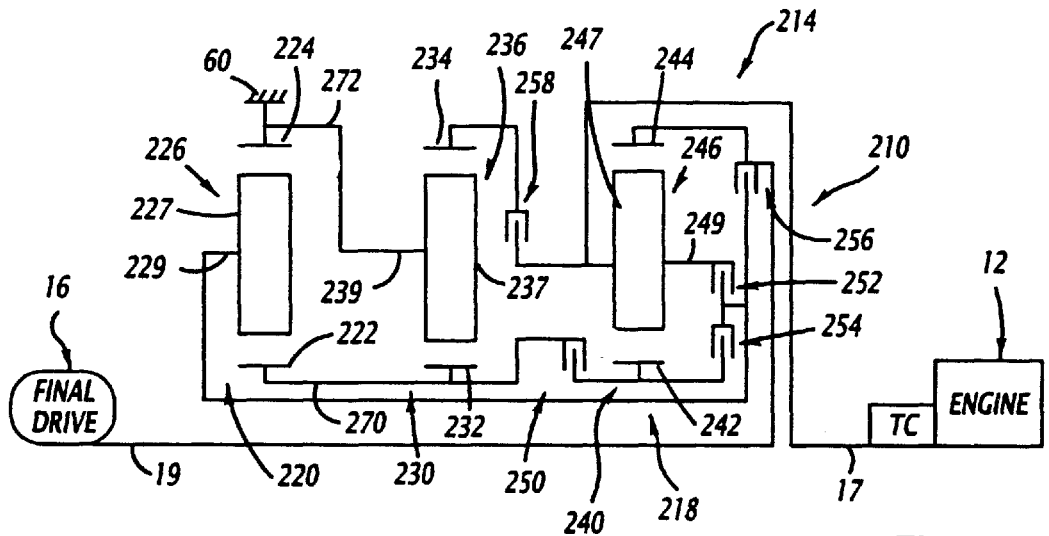
FIG. 5 is schematic representation of a powertrain incorporating another embodiment of the present invention.
FIG. 6 is a truth table and chart describing some of the operating characteristics of the powertrain depicted in FIG. 5.

A powertrain 210, shown in FIG. 5, includes the engine and torque converter 12, a planetary transmission 214, and the final drive mechanism 16. The planetary transmission 214 incorporates the input shaft 17, a planetary gear arrangement 218, and the output shaft 19. The planetary gear arrangement includes three simple planetary gear sets 220, 230, and 240, two continuous interconnecting members 270 and 272, and five torque transmitting mechanisms 250, 252, 254, 256, and 258. The planetary gear set 220 includes a sun gear member 222, a ring gear member 224, and a planet carrier assembly member 226 which incorporates a plurality of pinion gears 227 that are rotatably mounted on a carrier 229 and disposed in meshing relation with the sun gear member 222 and the ring gear member 224. The planetary gear set 230 includes a sun gear member 232, a ring gear member 234, and a planet carrier assembly member 236 which incorporates a plurality of pinion gears 237 that are rotatably mounted on a carrier 239 and disposed in meshing relation with the sun gear member 232 and the ring gear member 234. The planetary gear set 240 includes a sun gear member 242, a ring gear member 244, and a planet carrier assembly member 246 which incorporates a plurality of pinion gears 247 that are rotatably mounted on a carrier 249 and disposed in meshing relation with the sun gear member 242 and the ring gear member 244.

The input shaft 17 is continuously connected with planet carrier assembly member 246, and the output shaft 19 is continuously connected with the ring gear member 244. The sun gear member 232 and the sun gear member 222 are continuously interconnected by the interconnecting member 270. The planet carrier assembly member 236 and the ring gear member 224 are continuously interconnected with the housing 60 through the interconnecting member 272. The sun gear member 242, the ring gear member 234, and the planet carrier assembly member 226 are non-continuously interconnected with other members of the planetary gear sets 220, 230, and 240. The torque transmitting mechanism 250 selectively interconnects the sun gear member 242 with the interconnecting member 270. The torque transmitting mechanism 252 selectively interconnects the planet carrier assembly member 246 and the input shaft 17 with the planet carrier assembly member 226. The torque transmitting mechanism 254 selectively interconnects the sun gear member 242 with the planet carrier assembly member 226. The torque transmitting mechanism 256 selectively interconnects the planet carrier assembly member 226 with the ring gear member 244 and the output shaft 19. The torque transmitting mechanism 258 selectively interconnects the input shaft 17 and the planet carrier assembly member 246 with the ring gear member 234.

The torque transmitting mechanisms 250, 252, 254, 256, and 258 are selectively engaged in combinations of two, as shown in FIG. 6, to establish six forward speed ratios and a reverse speed ratio between the input shaft 17 and the output shaft 19. To establish the reverse speed ratio, the torque transmitting mechanisms 256 and 258 are engaged. The torque transmitting mechanism 256 interconnects the planet carrier assembly member 226 with the ring gear member 244 and the output shaft 19. The torque transmitting mechanism 258 interconnects the input shaft 17 and the planet carrier assembly member 246 with the ring gear member 234. The sun gear member 232 and the sun gear member 222 are driven in reverse at a speed determined by the speed of the ring gear member 234 and the tooth ratio of the planetary gear set 230. The planet carrier assembly member 226 and the output shaft 19 are driven in reverse at a reduced speed determined by the speed of the sun gear member 222 and the tooth ratio of the planetary gear set 220. The numerical value of the reverse speed ratio is determined by the ring/sun tooth ratios of the planetary gear sets 230 and 220.

The first forward speed ratio is established with the selective engagement of the torque transmitting mechanisms 250 and 252. The torque transmitting mechanism 250 selectively interconnects the sun gear member 242 with the interconnecting member 270. The torque transmitting mechanism 252 selectively interconnects the planet carrier assembly member 246 and the input shaft 17 with the planet carrier assembly member 226. The sun gear member 222, the sun gear member 232 and the sun gear member 242 are driven forwardly at a speed determined by the speed of the planet carrier assembly member 226 and the tooth ratio of the planetary gear set 220. The ring gear member 244 and the output shaft 19 are driven forwardly at a reduced speed determined by the speed of the planet carrier assembly member 246, the speed of the sun gear member 242, and the tooth ratio of the planetary gear set 240. The numerical value of the first forward speed ratio is determined by the ring/sun tooth ratios of the planetary gear sets 220 and 240.

The second forward speed ratio is established by the selective engagement of the torque transmitting mechanisms 250 and 256. The one/two interchange is a single transition interchange. The sun gear members 242, 232, and 222 are driven forwardly at a speed determined by the speed of the planet carrier assembly member 246 and the tooth ratio of the planetary gear set 240. The planet carrier assembly member 226, the ring gear member 244, and the output shaft 19 are driven forwardly at a speed determined by the speed of the sun gear member 222 and the tooth ratio of the planetary gear set 220. The ring gear member 244 is a rotating reaction member during this ratio. The numerical value of the second forward speed ratio is determined by the ring/sun tooth ratios of the planetary gear sets 220 and 240.

The third forward speed ratio is established with the selective engagement of the torque transmitting mechanisms 254 and 256. The two/three interchange is a single transition interchange. The torque transmitting mechanisms 254 and 256, when engaged at the same time, effectively connect the sun gear member 242 to the ring gear member 244 and therefore establish a direct drive in the planetary gear set 240. The third forward speed ratio is a one-to-one speed ratio.

The fourth forward speed ratio is established by the engagement of the torque transmitting mechanisms 250 and 254. The three/four interchange is a single transition interchange. The simultaneous engagement of the torque transmitting mechanisms 250 and 254 connects the planet carrier assembly member 226 with the sun gear members 222, 232, and 242. Since the planetary gear set 220 is held stationary, two members interconnected and one member connected to the housing 60, the sun gear member 242 is stationary. The ring gear member 244 and the output shaft 19 are rotated forwardly at an increased speed determined by the speed of the planet carrier assembly member 246 and the tooth ratio of the planetary gear set 240. The numerical value of the fourth forward speed ratio is determined by the ring/sun tooth ratio of the planetary gear set 240.

The fifth forward speed ratio is established with the selective engagement of the torque transmitting mechanisms 254 and 258. The four/five interchange is a single transition interchange. The sun gear members 232 and 222 are driven in reverse at a speed determined by the speed of the ring gear member 234 (input speed) and the tooth ratio of the planetary gear set 230. The planet carrier assembly member 226 and the sun gear member 242 are driven in reverse at a speed determined by the speed of the sun gear member 222 and the tooth ratio of the planetary gear set 220. The ring gear member 244 and the output shaft 19 are driven forwardly at an increased speed determined by the speed of the planet carrier assembly member 246 (input speed), the speed of the sun gear member 242, and the tooth ratio of the planetary gear set 240. The numerical value of the fifth forward speed ratio is determined by the ring/sun tooth ratios of the planetary gear sets 220, 230, and 240.

The sixth forward speed ratio is established with the selective engagement of the torque transmitting mechanisms 250 and 258. The five/six interchange is a single transition interchange. The sun gear members 232 and 242 are driven in reverse at a speed determined by the speed of the ring gear member 234 and the tooth ratio of the planetary gear set 230. The ring gear member 244 and the output shaft 19 are driven forwardly at an increased speed determined by the speed of the planet carrier assembly member 246, the speed of the sun gear member 242 and the tooth ratio of the planetary gear set 240. The numerical value of the sixth forward speed ratio is determined by the ring/sun tooth ratios of the planetary gear sets 230 and 240.

The truth table shown in FIG. 6 defines the torque transmitting mechanism engagement required for each of the forward speed ratios and the reverse speed ratio. As shown in FIG. 6, the torque transmitting mechanism 250, 252, 254, 256, and 258 are engaged in combinations of two to establish six forward speed ratios and a reverse speed ratio between the input shaft 17 and the output shaft 19. In the neutral condition all of the torque transmitting mechanisms are disengaged. The numerical values for the ratios have been determined using the ring gear/sun gear tooth ratios given in FIG. 6. The R1/S1 value is the ring gear/sun gear tooth ratio of the planetary gear set 220, the R2/S2 value is the ring gear/sun gear tooth ratio of the planetary gear set 230, and the R3/S3 value is the ring gear/sun gear tooth ratio of the planetary gear set 240. As can be determined from the truth table, the single ratio interchanges for the forward speed ratios are single transition interchanges. The double step interchanges, with the exception of the $1^{st}$ to $3^{rd}$ double step, are also single transition interchanges. FIG. 6 also describes the step ratio between adjacent ratios; for example, the numerical step between $1^{st}$ and $2^{nd}$ is 1.96.

Figures 7, 8:
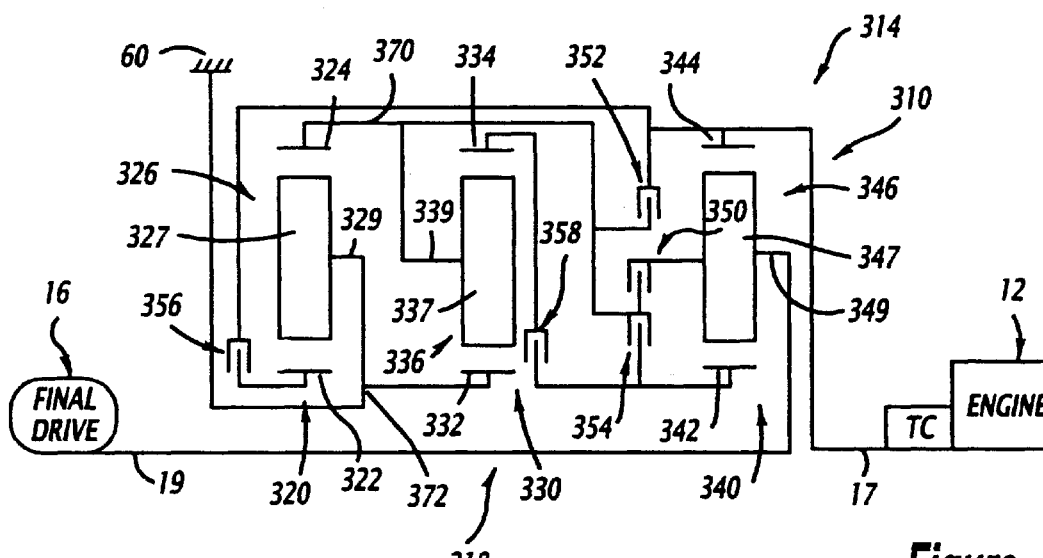
FIG. 7 is schematic representation of a powertrain incorporating another embodiment of the present invention.
FIG. 8 is a truth table and chart describing some of the operating characteristics of the powertrain depicted in FIG. 7.

A powertrain 310, shown in FIG. 7, includes the engine and torque converter 12, a multi-speed transmission 314, and the final drive mechanism 16. The transmission 314 incorporates the input shaft 17, a planetary gear arrangement 318, and the output shaft 19. The input shaft 17 is drivingly connected with the engine and torque converter 12 and the output shaft is connected with the final drive mechanism 16. The planetary gear arrangement includes three simple planetary gear sets 320, 330, and 340, five torque transmitting mechanisms 350, 352, 354, 356, and 358, and two interconnecting members 370 and 372. The interconnecting member 372 is continuously connected with the housing 60.

The planetary gear set 320 includes a sun gear member 322, a ring gear member 324, and a planet carrier assembly member 326 which incorporates a plurality of pinion gears 327 that are rotatably mounted on a carrier 329 and disposed in meshing relation with the sun gear member 322 and the ring gear member 324. The planetary gear set 330 includes a sun gear member 332, a ring gear member 334, and a planet carrier assembly member 336 which incorporates a plurality of pinion gears 337 that are rotatably mounted on a carrier 339 and disposed in meshing relation with the sun gear member 332 and the ring gear member 334. The planetary gear set 340 includes a sun gear member 342, a ring gear member 344, and a planet carrier assembly member 346 which incorporates a plurality of pinion gears 347 that are rotatably mounted on a carrier 349 and disposed in meshing relation with the sun gear member 342 and the ring gear member 344.

The input shaft 17 is continuously connected with the ring gear member 344 and the output shaft 19 is continuously connected with the planet carrier assembly member 346. The ring gear member 324 and the planet carrier assembly member 336 are continuously interconnected by the interconnecting member 370. The sun gear member 332 and the planet carrier assembly member 326 are continuously interconnected by the interconnecting member 372 and therefore to the housing 60. The sun gear member 342, the ring gear member 334, and the sun gear member 322 are non-continuously connected, other than the meshing relationship set forth above, with other members of the planetary gear sets 320, 330, or 340. The torque transmitting mechanism 350 selectively interconnects, when engaged, the output shaft 19 and the planet carrier assembly member 346 with the interconnecting member 370. The torque transmitting mechanism 352, when engaged, selectively interconnects the ring gear member 344 and the input shaft 17 with the interconnecting member 370. The torque transmitting mechanism 354, when engaged, selectively interconnects the sun gear member 342 with the interconnecting member 370. The torque transmitting mechanism 356, when engaged, selectively interconnects the input shaft 17 and the ring gear member 344 with the sun gear member 322. The torque transmitting mechanism 358, when engaged, selectively interconnects the sun gear member 342 and the ring gear member 334.

As seen in the truth table of FIG. 8, the torque transmitting mechanisms 350, 352, 354, 356, and 358 are selectively engaged in combination of two to provide six forward speed ratios and one reverse speed ratio. A neutral condition is also provided. The reverse speed ratio is established with the engagement of the torque transmitting mechanisms 350 and 356. The torque transmitting mechanism 350 selectively interconnects the ring gear member 324 and the planet carrier assembly member 336 with the planet carrier assembly member 346 and the output shaft 19. The torque transmitting mechanism 356 selectively interconnects the sun gear member 322 with the ring gear member 344 and the input shaft 17. The sun gear member 322 is driven forwardly at the speed of the input shaft 17. The ring gear member 324 and the output shaft 19 are driven in reverse at a reduced speed determined by the speed of the sun gear member 322 and the tooth ratio of the planetary gear set 320. The numerical value of the reverse speed ratio is determined by the ring/sun tooth ratio of the planetary gear set 320.

The first forward speed ratio is established with the selective engagement of the torque transmitting mechanisms 356 and 358. The torque transmitting mechanism 356 may remain engaged through the neutral condition. The torque transmitting mechanism 358 selectively connects the sun gear member 342 with the ring gear member 334. The sun gear member 322 is rotated forwardly at the speed of the input shaft 17 resulting in the ring gear member 324 and the planet carrier assembly member 336 being rotated in reverse at a speed determined by the speed of the sun gear member 322 and the tooth ratio of the planetary gear set 320. The ring gear member 334 and the sun gear member 342 are rotated in reverse at a speed determined by the speed of the planet carrier assembly member 336 and the tooth ratio of the planetary gear set 330. The planet carrier assembly member 346 is driven forwardly at a speed determined by the speed of the ring gear member 344, the speed of the sun gear member 342 and the tooth ratio of the planetary gear set 340. The numerical value of the first forward speed ratio is determined by the ring/sun tooth ratios of the planetary gear sets 320, 330, and 340.

The second forward speed ratio is established by the selective engagement of the torque transmitting mechanisms 356 and 354. The one/two interchange is a single transition interchange. The torque transmitting mechanism 354 selectively interconnects the sun gear member 342 with the planet carrier assembly member 336 and the ring gear member 324. The ring gear member 324 and the sun gear member 342 are driven in reverse at a speed determined by the speed of the sun gear member 322 (input speed) and the tooth ratio of the planetary gear set 320. The planet carrier assembly member 346 and the output shaft 19 are driven forwardly at a reduced speed determined by the speed of the ring gear member 344 (input speed), the speed of the sun gear member 342, and the tooth ratio of the planetary gear set 340. The numerical value of the second forward speed ratio is determined by the ring/sun tooth ratios of the planetary gear sets 320 and 340.

The third forward speed ratio is established with the selective engagement of the torque transmitting mechanisms 354 and 358. The two/three interchange is a single transition interchange. The engagement of both torque transmitting mechanisms 354 and 358 effectively connects the sun gear member 342 with the housing 60. The planet carrier assembly member 346 and the output shaft 19 are driven forwardly at a reduced speed determined by the speed of the ring gear member 344 and the tooth ratio of the planetary gear set 340. The numerical value of the third forward speed ratio is determined by the ring/sun tooth ratio of the planetary gear set 340.

The fourth forward speed ratio is established by the selective engagement of the torque transmitting mechanisms 352 and 354. The three/four interchange is a single transition interchange. The torque transmitting mechanism 352 selectively interconnects the input shaft 17 and the ring gear member 344 with the interconnecting member 370 such that the planet carrier assembly member 336 and the ring gear member 324 are rotated at the speed of the input shaft 17. The sun gear member 342 is also interconnected with the input shaft through both torque transmitting mechanisms 354 and 352 whereby the sun gear member 342, the ring gear member 344, the planet carrier assembly member 346, and the output shaft 19 rotate in unison with the input shaft 17. The fourth forward speed ratio is a one-to-one ratio or direct drive condition.

The fifth forward speed ratio is determined by the selective engagement of the torque transmitting mechanisms 352 and 358. The four/five interchange is a single transition interchange. The ring gear member 334 and sun gear member 342 are driven forwardly at a speed determined by the speed of the planet carrier assembly member 336 (input speed) and the tooth ratio of the planetary gear set 330. The planet carrier assembly member 346 and the output shaft 19 are driven forwardly at an increased speed determined by the speed of the ring gear member 344, the speed of the sun gear member 342, and the tooth ratio of the planetary gear set 340. The numerical value of the fifth forward speed ratio is determined by the ring/sun tooth ratios of the planetary gear sets 330 and 340.

The sixth forward speed ratio is established with the selective engagement of the torque transmitting mechanisms 350 and 358. The five/six interchange is a single transition interchange. The sun gear member 332 is the stationary reaction member in the planetary gearing combination established by the torque transmitting mechanisms 350 and 358 during this speed ratio. The forward rotation of the of the ring gear member 344 results in an increased forward speed of the planet carrier assembly member 346 that is determined by the speed of the ring gear member 344, the speed of the ring gear member 334 and the sun gear member 342, and the tooth ratios of the planetary gear sets 330 and 340. The numerical value of the sixth forward speed ratio is determined by the ring/sun tooth ratios of the planetary gear sets 330 and 340.

The truth table shown in FIG. 8 defines the torque transmitting mechanism engagement required for each of the forward speed ratios and the reverse speed ratio. As shown in FIG. 8, the torque transmitting mechanism 350, 352, 354, 356, and 358 are engaged in combinations of two to establish six forward speed ratios and a reverse speed ratio between the input shaft 17 and the output shaft 19. The truth table also indicates that the torque transmitting mechanism 356 can remain engaged during the neutral condition thereby simplifying the first/reverse interchange. The numerical values for the ratios have been determined using the ring gear/sun gear tooth ratios given in FIG. 8. The R1/S1 value is the ring gear/sun gear tooth ratio of the planetary gear set 320, the R2/S2 value is the ring gear/sun gear tooth ratio of the planetary gear set 330, and the R3/S3 value is the ring gear/sun gear tooth ratio of the planetary gear set 340. As can be determined from the truth table, the single ratio interchanges for the forward speed ratios are single transition interchanges. Also, double step interchanges such as $1^{st}$ to $3^{rd}$, $2^{nd}$ to $4^{th}$ and $3^{rd}$ to $5^{th}$, but not $4^{th}$ to $6^{th}$, are single transition interchanges. FIG. 8 also describes the ratio step between adjacent ratios; for example, the numerical step between $1^{st}$ and $2^{nd}$ is 1.43.

Figures 9, 10:
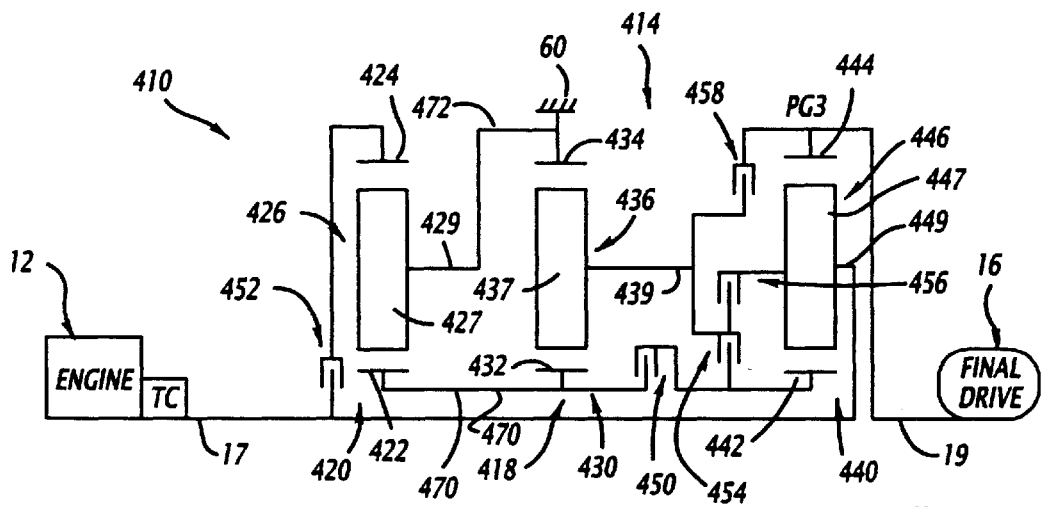
FIG. 9 is schematic representation of a powertrain incorporating another embodiment of the present invention.
FIG. 10 is a truth table and chart describing some of the operating characteristics of the powertrain depicted in FIG. 9.

A powertrain 410, shown in FIG. 9, has the conventional engine and torque converter 12, a planetary transmission 414, and the conventional final drive 16. The engine and torque converter 12 are drivingly connected with the transmission 414 through an input 17. The transmission is drivingly connected with the final drive 16 through an output 19. The planetary transmission 414 includes a planetary gear arrangement 418 that includes a first planetary gear set 420, a second planetary gear set 430 and a third planetary gear set 440, five torque transmitting mechanism 450, 452, 454, 456, and 458 which are conventional selectively engageable fluid-operated devices, and two interconnecting members 470 and 472. The interconnecting member 472 is continuously connected with the housing 60. The torque transmitting mechanisms 450, 452, 454, 456, and 458 are rotating-type mechanisms which are commonly termed clutches.

The planetary gear set 420 includes a sun gear member 422, a ring gear member 424, and a planet carrier assembly member 426 that has a plurality of planet pinion gear members 427 rotatably mounted on a planet carrier 429 and disposed in meshing relation with the sun gear member 422 and the ring gear member 424. The planetary gear set 430 includes a sun gear member 432, a ring gear member 434, and a planet carrier assembly member 436 that has a plurality of planet pinion gears 437 rotatably mounted on a planet carrier 439 and disposed in meshing relation with the sun gear member 432 and the ring gear member 434. The planetary gear set 440 has a sun gear member 442, a ring gear member 444, and a planet carrier assembly member 446 that includes a plurality of planet pinion gears 447 rotatably mounted on a planet carrier 449 and disposed in meshing relation with the sun gear member 442 and the ring gear member 444.

The input shaft 17 is continuously connected with the planet carrier assembly member 446 and the output shaft 19 is continuously connected with the ring gear member 344. The interconnecting member 470 continuously interconnects the sun gear member 422 with the sun gear member 432. The interconnecting member 472 continuously interconnects the planet carrier assembly member 426 with the ring gear member 434 which are both connected with the housing 60. Except for the respective meshing connections, the sun gear member 442, the planet carrier assembly member 436, and the ring gear member 424 are non-continuously connected with other members of the planetary gear sets 420, 430, and 440. The torque transmitting mechanism 450 selectively interconnects the sun gear member 442 with the interconnecting member 470 and therefore the sun gear members 432 and 422. The torque transmitting mechanism 452 selectively interconnects the input shaft 17 and the planet carrier assembly member 446 with the ring gear member 424. The torque transmitting mechanism 454 selectively interconnects the sun gear member 442 with the planet carrier assembly member 436. The torque transmitting mechanism 456 selectively interconnects the planet carrier assembly member 446 and the input shaft 17 with the planet carrier assembly member 436. The torque transmitting mechanism 458 selectively interconnects the output shaft 19 and the ring gear member 444 with the planet carrier assembly member 436.

The truth table, shown in FIG. 10, defines the torque transmitting mechanism engagement required for each of the forward speed ratios and the reverse speed ratio. The numerical values for the ratios have been determined using the ring/sun tooth ratios given in FIG. 10. The R1/S1 value is the ring/sun tooth ratio of the planetary gear set 420, the R2/S2 value is the ring/sun tooth ratio of the planetary gear set 430, and the R3/S3 value is the ring/sun tooth ratio of the planetary gear set 440. As can be determined from the truth table, the single ratio interchanges for the forward speed ratios are single transition interchanges. Also, the double step interchanges, with the exception of $1^{st}$ to $3^{rd}$, are single transition interchanges. FIG. 10 also describes the step ratio between adjacent ratios; for example, the numerical step between $1^{st}$ and $2^{nd}$ is 1.87.

Those skilled in the art will recognize that the numerical value of the reverse speed ratio is determined by the ring/sun tooth ratios of the planetary gear sets 420 and 430. The numerical value of the first forward speed ratio is determined by the ring/sun tooth ratios of the planetary gear sets 430, and 440. The numerical value of the second forward speed ratio is determined by the ring/sun tooth ratios of the planetary gear sets 430 and 440. The numerical value of the third forward speed ratio is one. The numerical value of the fourth forward speed ratio is determined by the ring/sun tooth ratios of the planetary gear set 440. The numerical value of the fifth forward speed ratio is determined by the ring/sun tooth ratios of the planetary gear sets 420, 430, and 440. The numerical value of the sixth forward speed ratio is determined by the ring/sun tooth ratios of the planetary gear set 430 and 440.

Figures 11, 12:
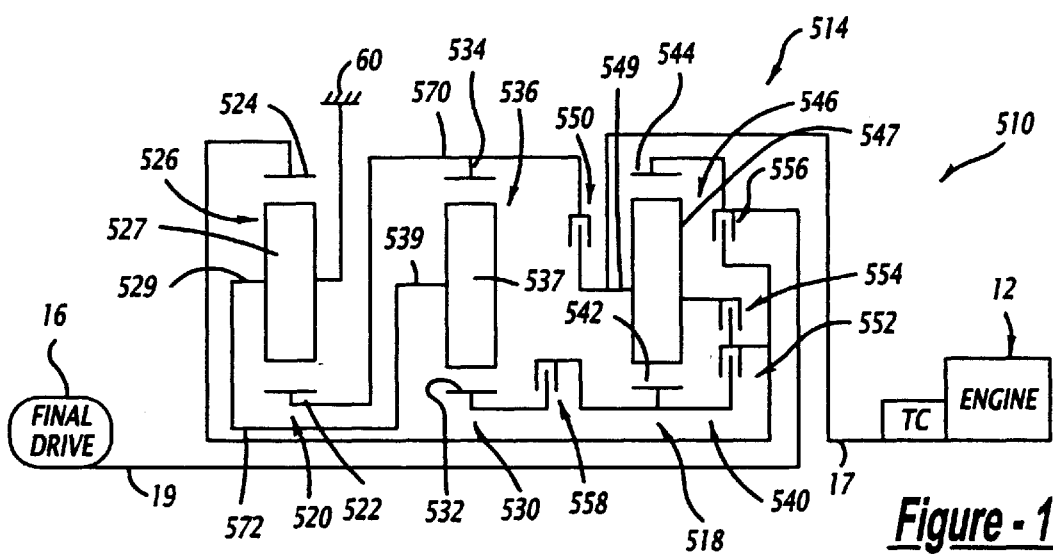
FIG. 11 is schematic representation of a powertrain incorporating another embodiment of the present invention.
FIG. 12 is a truth table and chart describing some of the operating characteristics of the powertrain depicted in FIG. 11.

A powertrain 510, shown in FIG. 11, has the conventional engine and torque converter 12, a planetary transmission 514, and the conventional final drive 16. The engine and torque converter 12 are drivingly connected with the transmission 514 through an input 17. The transmission is drivingly connected with the final drive 16 through an output 19. The planetary transmission 514 includes a planetary gear arrangement 518 that includes a first planetary gear set 520, a second planetary gear set 530 and a third planetary gear set 540, five torque transmitting mechanism 550, 552, 554, 556, and 558 which are conventional selectively engageable fluid-operated devices, and two interconnecting members 570 and 572. The interconnecting member 572 is continuously connected with the housing 60. The torque transmitting mechanisms 550, 552, 554, 556, and 558 are rotating-type mechanisms which are commonly termed clutches.

The planetary gear set 520 includes a sun gear member 522, a ring gear member 524, and a planet carrier assembly member 526 that has a plurality of planet pinion gear members 527 rotatably mounted on a planet carrier 529 and disposed in meshing relation with the sun gear member 522 and the ring gear member 524. The planetary gear set 530 includes a sun gear member 532, a ring gear member 534, and a planet carrier assembly member 536 that has a plurality of planet pinion gears 537 rotatably mounted on a planet carrier 539 and disposed in meshing relation with the sun gear member 532 and the ring gear member 534. The planetary gear set 540 has a sun gear member 542, a ring gear member 544, and a planet carrier assembly member 546 that includes a plurality of planet pinion gears 547 rotatably mounted on a planet carrier 549 and disposed in meshing relation with the sun gear member 542 and the ring gear member 544.

The input shaft 17 is continuously connected with the planet carrier assembly member 546 and the output shaft 19 is continuously connected with the ring gear member 544. The sun gear member 522 and the ring gear member 534 are continuously interconnected through the interconnecting member 570. The planet carrier assembly member 526 and the planet carrier assembly member 536 are continuously interconnected with the housing 60 through the interconnecting member 572. With the exception of the above-described intermeshing relations, the sun gear member 542, the sun gear member 532, and the ring gear member 524 are non-continuously connected with other members of the respective planetary gear sets 520, 530, and 540.

The truth table, shown in FIG. 12, defines the torque transmitting mechanism engagement required for each of the forward speed ratios and the reverse speed ratio. The numerical values for the ratios have been determined using the ring/sun tooth ratios given in FIG. 12. The R1/S1 value is the ring/sun tooth ratio of the planetary gear set 520, the R2/S2 value is the ring/sun tooth ratio of the planetary gear set 530, and the R3/S3 value is the ring/sun tooth ratio of the planetary gear set 540. As can be determined from the truth table, the single ratio interchanges for the forward speed ratios are single transition interchanges. Also, the double step interchanges, with the exception of the $1^{st}$ to $3^{rd}$ interchange, are single transition interchanges. FIG. 12 also describes the step ratio between adjacent ratios; for example, the numerical step between $1^{st}$ and $2^{nd}$ is 1.92.

Those skilled in the art will recognize that the numerical value of the reverse speed ratio is determined by the ring/sun tooth ratio of the planetary gear set 520. The numerical value of the first forward speed ratio is determined by the ring/sun tooth ratios of the planetary gear sets 520, 530, and 540. The numerical value of the second forward speed ratio is determined by the ring/sun tooth ratios of the planetary gear sets 520, 530, and 540. The numerical value of the third forward speed ratio is one. The numerical value of the fourth forward speed ratio is determined by the ring/sun tooth ratios of the planetary gear sets 520, 530, and 540. The numerical value of the fifth forward speed ratio is determined by the ring/sun tooth ratios of the planetary gear sets 520 and 540. The numerical value of the sixth forward speed ratio is determined by the ring/sun tooth ratios of the planetary gear sets 530 and 540.

Figures 13, 14:
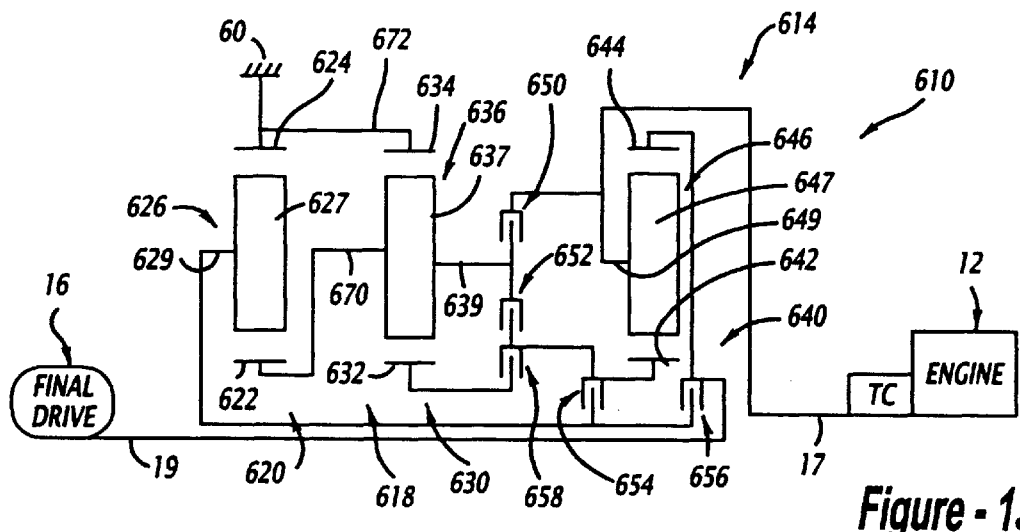
FIG. 13 is schematic representation of a powertrain incorporating another embodiment of the present invention.
FIG. 14 is a truth table and chart describing some of the operating characteristics of the powertrain depicted in FIG. 13.

A powertrain 610, shown in FIG. 13, has the conventional engine and torque converter 12, a planetary transmission 614, and the conventional final drive 16. The engine and torque converter 12 are drivingly connected with the transmission 614 through an input 17. The transmission is drivingly connected with the final drive 16 through an output 19. The planetary transmission 614 includes a planetary gear arrangement 618 that includes a first planetary gear set 620, a second planetary gear set 630 and a third planetary gear set 640, five torque transmitting mechanism 650, 652, 654, 656, and 658 which are conventional selectively engageable fluid-operated devices, and two interconnecting members 670 and 672. The interconnecting member 672 is continuously connected with the housing 60. The torque transmitting mechanisms 650, 652, 654, 656, and 658 are rotating-type mechanisms which are commonly termed clutches.

The planetary gear set 620 includes a sun gear member 622, a ring gear member 624, and a planet carrier assembly member 626 that has a plurality of planet pinion gear members 627 rotatably mounted on a planet carrier 629 and disposed in meshing relation with the sun gear member 622 and the ring gear member 624. The planetary gear set 630 includes a sun gear member 632, a ring gear member 634, and a planet carrier assembly member 636 that has a plurality of planet pinion gears 637 rotatably mounted on a planet carrier 639 and disposed in meshing relation with the sun gear member 632 and the ring gear member 634. The planetary gear set 640 has a sun gear member 642, a ring gear member 644, and a planet carrier assembly member 646 that includes a plurality of planet pinion gears 647 rotatably mounted on a planet carrier 649 and disposed in meshing relation with the sun gear member 642 and the ring gear member 644.

The input shaft 17 is continuously connected with the planet carrier assembly member 646 and the output shaft 19 is continuously connected with the ring gear member 644. The sun gear member 622 and the planet carrier assembly member 636 are continuously interconnected through the interconnecting member 670. The ring gear member 624 and the ring gear member 634 are continuously connected with the housing through the interconnecting member 672. Except for the meshing interconnection mentioned above, the sun gear member 642, the sun gear member 632 and the planet carrier assembly member 626 are non-continuously with other members of the respective planetary gear sets 620, 630, and 640. The torque transmitting mechanism 650 selectively interconnects the input shaft 17 and the planet carrier assembly member 646 with the interconnecting member 670. The torque transmitting mechanism 652 selectively interconnects the sun gear member 642 with the interconnecting member 670. The torque transmitting mechanism 654 selectively interconnects the sun gear member 642 with the planet carrier assembly member 626. The torque transmitting mechanism 656 selectively interconnects the ring gear member 644 and the output shaft 19 with the planet carrier assembly member 626. The torque transmitting mechanism 658 selectively interconnects the sun gear member 642 with the sun gear member 632.

The truth table, shown in FIG. 14, defines the torque transmitting mechanism engagement required for each of the forward speed ratios and the reverse speed ratio. Alternative engagement combinations of engagement for the fourth and sixth forward speed ratios are shown in parentheses. The numerical values for the ratios have been determined using the ring/sun tooth ratios given in FIG. 14. The R1/S1 value is the ring/sun tooth ratio of the planetary gear set 620, the R2/S2 value is the ring/sun tooth ratio of the planetary gear set 630, and the R3/S3 value is the ring/sun tooth ratio of the planetary gear set 640. As can be determined from the truth table, the single ratio interchanges for the forward speed ratios are single transition interchanges. Also, the double step interchanges, with the exception of the, $3^{rd}$ to $5^{th}$ interchange, are single transition interchanges. FIG. 14 also describes the step ratio between adjacent ratios; for example, the numerical step between $1^{st}$ and $2^{nd}$ is 1.41.

Those skilled in the art will recognize that the numerical value of the reverse speed ratio is determined by the ring/sun tooth ratios of the planetary gear sets 630 and 640. The numerical value of the first forward speed ratio is determined by the ring/sun tooth ratios of the planetary gear sets 620, 630, and 640. The numerical value of the second forward speed ratio is determined by the ring/sun tooth ratio of the planetary gear set 620. The numerical value of the third forward speed ratio is determined by the ring/sun tooth ratios of the planetary gear sets 620 and 640. The numerical value of the fourth forward speed ratio is one. The numerical value of the fifth forward speed ratio is determined by the ring/sun tooth ratios of the planetary gear sets 620 and 640. The numerical value of the sixth forward speed ratio is determined by the ring/sun tooth ratio of the planetary gear set 640.

Figures 15, 16:
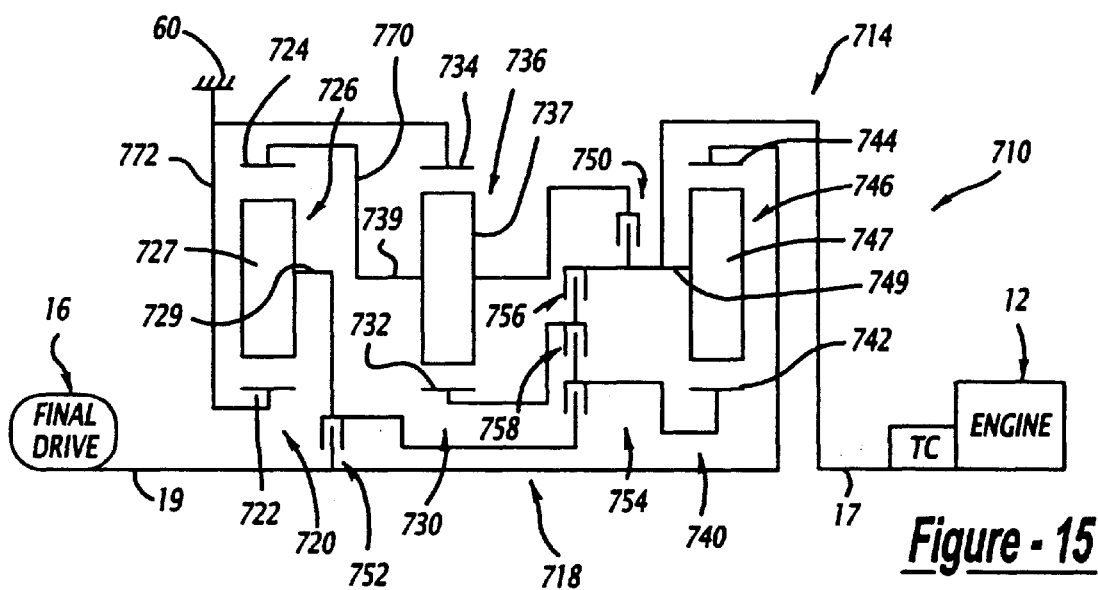
FIG. 15 is schematic representation of a powertrain incorporating another embodiment of the present invention.
FIG. 16 is a truth table and chart describing some of the operating characteristics of the powertrain depicted in FIG. 15.

A powertrain 710, shown in FIG. 15, has the conventional engine and torque converter 12, a planetary transmission 714, and the conventional final drive 16. The engine and torque converter 12 are drivingly connected with the transmission 714 through an input 17. The transmission is drivingly connected with the final drive 16 through an output 19. The planetary transmission 714 includes a planetary gear arrangement 718 that includes a first planetary gear set 720, a second planetary gear set 730 and a third planetary gear set 740, five torque transmitting mechanism 750, 752, 754, 756, and 758 which are conventional selectively engageable fluid-operated devices, and two interconnecting members 770 and 772. The interconnecting member 772 is continuously connected with the housing 60. The torque transmitting mechanisms 750, 752, 754, 756, and 758 are rotating-type mechanisms which are commonly termed clutches.

The planetary gear set 720 includes a sun gear member 722, a ring gear member 724, and a planet carrier assembly member 726 that has a plurality of planet pinion gear members 727 rotatably mounted on a planet carrier 729 and disposed in meshing relation with the sun gear member 722 and the ring gear member 724. The planetary gear set 730 includes a sun gear member 732, a ring gear member 734, and a planet carrier assembly member 736 that has a plurality of planet pinion gears 737 rotatably mounted on a planet carrier 739 and disposed in meshing relation with the sun gear member 732 and the ring gear member 734. The planetary gear set 740 has a sun gear member 742, a ring gear member 744, and a planet carrier assembly member 746 that includes a plurality of planet pinion gears 747 rotatably mounted on a planet carrier 749 and disposed in meshing relation with the sun gear member 742 and the ring gear member 744.

The input shaft 17 is continuously connected with the planet carrier assembly member 746 and the output shaft is continuously connected with the ring gear member 744. The ring gear member 724 and the planet carrier assembly member 736 are continuously interconnected through the interconnecting member 770. The sun gear member 722 and the ring gear member 734 are continuously connected with the housing 60 through the interconnecting member 772. Except for the meshing relations described above, the sun gear member 742, the sun gear member 732 and the planet carrier assembly member 726 are non-continuously interconnected with other members of the respective planetary gear sets 720, 730, and 740. The torque transmitting mechanism 750 selectively interconnects the input shaft 17 and the planet carrier assembly member 746 with the interconnecting member 770. The torque transmitting mechanism 752 selectively interconnects the output shaft 19 and the ring gear member 744 with the planet carrier assembly member 726. The torque transmitting mechanism 754 selectively interconnects the sun gear member 742 with the planet carrier assembly member 726. The torque transmitting mechanism 756 selectively interconnects the input shaft 17 and the planet carrier assembly member 746 with the sun gear member 732. The torque transmitting mechanism 758 selectively interconnects the sun gear member 742 with the sun gear member 732.

The truth table, shown in FIG. 16, defines the torque transmitting mechanism engagement required for each of the forward speed ratios and the reverse speed ratio. The torque transmitting mechanisms 750, 752, 754, 756, and 758 are engaged in combinations of two to establish seven forward speed ratios and one reverse speed ratio between the input shaft 17 and the output shaft 19. The numerical values for the ratios have been determined using the ring/sun tooth ratios given in FIG. 16. The R1/S1 value is the ring/sun tooth ratio of the planetary gear set 720, the R2/S2 value is the ring/sun tooth ratio of the planetary gear set 730, and the R3/S3 value is the ring/sun tooth ratio of the planetary gear set 740. As can be determined from the truth table, the single ratio interchanges for the forward speed ratios are single transition interchanges. Also, the double step interchanges, such as $1^{st}$ to $3^{rd}$, $2^{nd}$ to $4^{th}$, $3^{rd}$ to $5^{th}$, $4^{th}$ to $6^{th}$, and $5^{th}$ to $7^{th}$, are single transition interchanges. FIG. 16 also describes the step ratio between adjacent ratios; for example, the numerical step between $1^{st}$ and $2^{nd}$ is 1.86.

Those skilled in the art will recognize that the numerical value of the reverse speed ratio is determined by the ring/sun tooth ratios of the planetary gear sets 730 and 740. The numerical value of the first forward speed ratio is determined by the ring/sun tooth ratios of the planetary gear sets 720 and 730. The numerical value of the second forward speed ratio is determined by the ring/sun tooth ratios of the planetary gear sets 720, 730, and 740. The numerical value of the third forward speed ratio is determined by the ring/sun tooth ratio of the planetary gear set 720. The numerical value of the fourth forward speed ratio is one. The numerical value of the fifth forward speed ratio is determined by the ring/sun tooth ratios of the planetary gear sets 720 and 740. The numerical value of the sixth forward speed ratio is determined by the ring/sun tooth ratios of the planetary gear set 720, 730, and 740. The numerical value of the of the seventh forward speed ratio is determined by the ring/sun tooth ratios of the planetary gear sets 720, 730, 740.

Figures 17, 18:
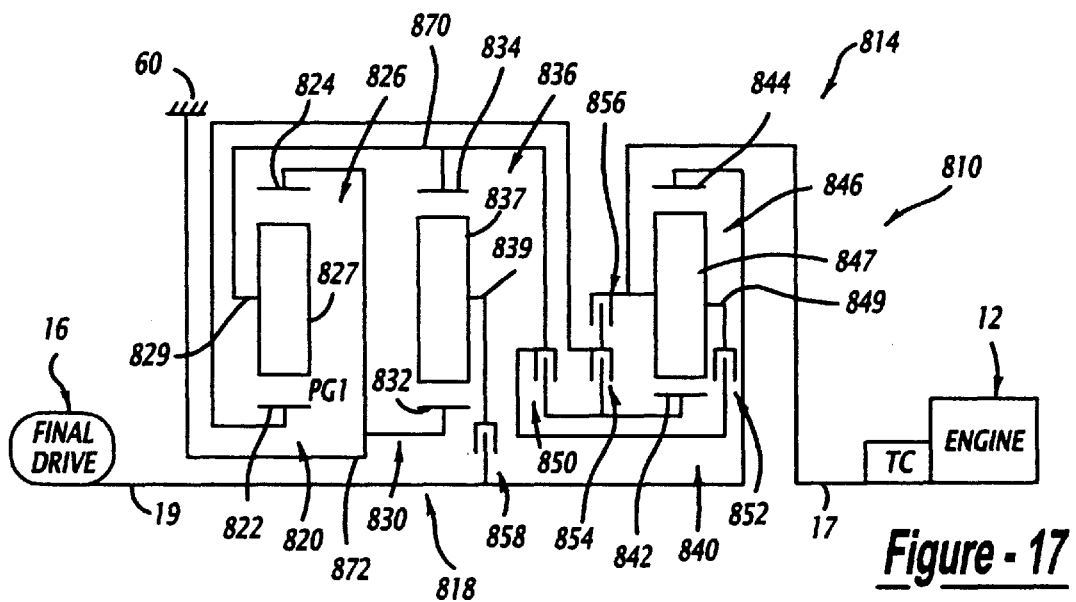
FIG. 17 is schematic representation of a powertrain incorporating another embodiment of the present invention.
FIG. 18 is a truth table and chart describing some of the operating characteristics of the powertrain depicted in FIG. 17.

A powertrain 810, shown in FIG. 17, has the conventional engine and torque converter 12, a planetary transmission 814, and the conventional final drive 16. The engine and torque converter 12 are drivingly connected with the transmission 814 through an input 17. The transmission is drivingly connected with the final drive 16 through an output 19. The planetary transmission 814 includes a planetary gear arrangement 818 that includes a first planetary gear set 820, a second planetary gear set 830 and a third planetary gear set 840, five torque transmitting mechanism 850, 852, 854, 856, and 858 which are conventional selectively engageable fluid-operated devices, and two interconnecting members 870 and 872. The interconnecting member 872 is continuously connected with the housing 60. The torque transmitting mechanisms 850, 852, 854, 856, and 858 are rotating-type mechanisms, commonly termed clutches which, as described in FIG. 18, are selectively engaged in combinations of two to establish seven forward speed ratios and one reverse speed ratio between the input shaft 17 and the output shaft 19.

The planetary gear set 820 includes a sun gear member 822, a ring gear member 824, and a planet carrier assembly member 826 that has a plurality of planet pinion gear members 827 rotatably mounted on a planet carrier 829 and disposed in meshing relation with the sun gear member 822 and the ring gear member 824. The planetary gear set 830 includes a sun gear member 832, a ring gear member 834, and a planet carrier assembly member 836 that has a plurality of planet pinion gears 837 rotatably mounted on a planet carrier 839 and disposed in meshing relation with the sun gear member 832 and the ring gear member 834. The planetary gear set 840 has a sun gear member 842, a ring gear member 844, and a planet carrier assembly member 846 that includes a plurality of planet pinion gears 847 rotatably mounted on a planet carrier 849 and disposed in meshing relation with the sun gear member 842 and the ring gear member 844.

The input shaft 17 is continuously connected with the planet carrier assembly member 846 and the output shaft is continuously connected with the ring gear member 844. The planet carrier assembly member 826 and the ring gear member 834 are continuously interconnected through the interconnecting member 870. The ring gear member 824 and the sun gear member 832 are continuously connected with the housing 60 through the interconnecting member 872. Except for the meshing relation described above, the sun gear member 842, the planet carrier assembly member 836, and the sun gear member 822 are non-continuously interconnected with other members of the respective planetary gear sets 820, 830, and 840. The torque transmitting mechanism 850 selectively interconnects the sun gear member 842 with the interconnecting member 870. The torque transmitting mechanism 852 selectively interconnects the input shaft 17 and the planet carrier assembly member 846 with the interconnecting member 870. The torque transmitting mechanism 854 selectively interconnects the sun gear member 842 with the sun gear member 822. The torque transmitting mechanism 856 selectively interconnects the input shaft 17 and the planet carrier assembly member 846 with the sun gear member 822. The torque transmitting mechanism 858 selectively interconnects the output shaft 19 and the ring gear member 844 with the planet carrier assembly member 836.

The truth table, shown in FIG. 18, defines the torque transmitting mechanism engagement required for each of the seven forward speed ratios and the reverse speed ratio. The numerical values for the ratios have been determined using the ring/sun tooth ratios given in FIG. 18. The R1/S1 value is the ring/sun tooth ratio of the planetary gear set 820, the R2/S2 value is the ring/sun tooth ratio of the planetary gear set 830, and the R3/S3 value is the ring/sun tooth ratio of the planetary gear set 840. As can be determined from the truth table, the single ratio interchanges for the forward speed ratios are single transition interchanges. Also, the double step interchanges, such as $1^{st}$ to $3^{rd}$, $2^{nd}$ to $4^{th}$, $3^{rd}$ to $5^{th}$, $4^{th}$ to $6^{th}$, and $5^{th}$ to $7^{th}$, are single transition interchanges. FIG. 18 also describes the step ratio between adjacent ratios; for example, the numerical step between $1^{st}$ and $2^{nd}$ is 2.09.

Those skilled in the art will recognize that the numerical value of the reverse speed ratio is determined by the ring/sun tooth ratios of the planetary gear sets 820 and 840. The numerical value of the first forward speed ratio is determined by the ring/sun tooth ratios of the planetary gear sets 820 and 830. The numerical value of the second forward speed ratio is determined by the ring/sun tooth ratios of the planetary gear sets 820, 830, and 840. The numerical value of the third forward speed ratio is determined by the ring/sun tooth ratio of the planetary gear set 830. The numerical value of the fourth forward speed ratio is determined by the ring/sun tooth ratios of the planetary gear sets 830 and 840. The numerical value of the fifth forward speed ratio is one. The numerical value of the sixth forward speed ratio is determined by the ring/sun tooth ratios of the planetary gear set 820 and 840. The numerical value of the seventh forward speed ratio is determined by the ring/sun tooth ratio of the planetary gear set 840.

Figures 19, 20:
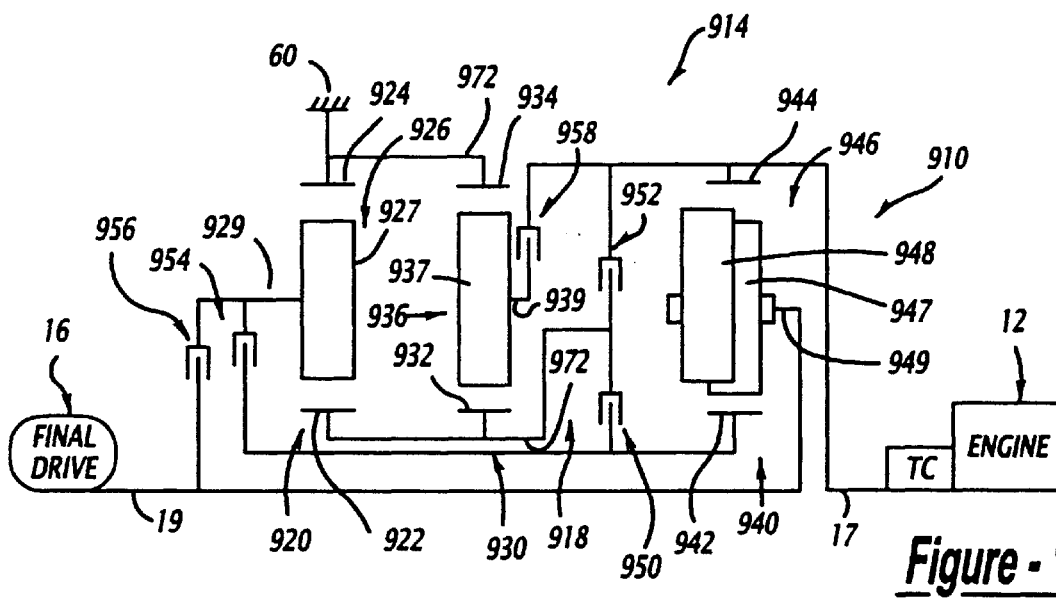
FIG. 19 is schematic representation of a powertrain incorporating another embodiment of the present invention.
FIG. 20 is a truth table and chart describing some of the operating characteristics of the powertrain depicted in FIG. 19.

A powertrain 910, shown in FIG. 19, has the conventional engine and torque converter 12, a planetary transmission 914, and the conventional final drive 16. The engine and torque converter 12 are drivingly connected with the transmission 914 through an input shaft 17. The transmission is drivingly connected with the final drive 16 through an output shaft 19. The planetary transmission 914 includes a planetary gear arrangement 918 that includes a first planetary gear set 920, a second planetary gear set 930 and a third planetary gear set 940, five torque transmitting mechanism 950, 952, 954, 956, and 958 which are conventional selectively engageable fluid-operated devices, and two interconnecting members 970 and 972. The interconnecting member 972 is continuously connected with the housing 60. The torque transmitting mechanisms 950, 952, 954, 956, and 958 are rotating-type mechanisms which are commonly termed clutches. The torque transmitting mechanisms are selectively engageable in combinations of two, as shown in FIG. 20, to establish seven forward speed ratios and one reverse speed ratio between the input shaft 17 and the output shaft 19.

The planetary gear set 920 includes a sun gear member 922, a ring gear member 924, and a planet carrier assembly member 926 that has a plurality of planet pinion gear members 927 rotatably mounted on a planet carrier 929 and disposed in meshing relation with the sun gear member 922 and the ring gear member 924. The planetary gear set 930 includes a sun gear member 932, a ring gear member 934, and a planet carrier assembly member 936 that has a plurality of planet pinion gears 937 rotatably mounted on a planet carrier 939 and disposed in meshing relation with the sun gear member 932 and the ring gear member 934. The planetary gear set 940 has a sun gear member 942, a ring gear member 944, and a planet carrier assembly member 946 that includes a plurality of intermeshing planet pinion gears 947 and 948 that are rotatably mounted on a planet carrier 949 and disposed in meshing relation with the sun gear member 942 and the ring gear member 944, respectively.

The input shaft 17 is continuously connected with the ring gear member 944 and the output shaft 19 is continuously connected with the planet carrier assembly member 946. The sun gear member 922 and the sun gear member 932 are continuously interconnected by the interconnecting member 970. The ring gear member 924 and the ring gear member 934 are continuously interconnected with the housing 60 through the interconnecting member 972. The sun gear member 942, the planet carrier assembly member 936 and the planet carrier assembly member 926 are, except for the intermeshing relationships set forth above, non-continuously interconnected members of the respective planetary gear sets 920, 930, and 940. The torque transmitting mechanism 950 selectively interconnects the interconnecting member 970 and the sun gear member 942. The torque transmitting mechanism 952 selectively interconnects the input shaft 17 and the ring gear member 944 with the interconnecting member 970. The torque transmitting mechanism 954 selectively interconnects the sun gear member 942 and the planet carrier assembly member 926. The torque transmitting mechanism 956 selectively interconnects the planet carrier assembly member 926 with the planet carrier assembly member 946 and the output shaft 19. The torque transmitting mechanism 958 selectively interconnects the input shaft 17 and the ring gear member 944 with the planet carrier assembly member 936.

The truth table, shown in FIG. 20, defines the torque transmitting mechanism engagement required for each of the forward speed ratios and the reverse speed ratio. The numerical values for the ratios have been determined using the ring/sun tooth ratios given in FIG. 20. The R1/S1 value is the ring/sun tooth ratio of the planetary gear set 920, the R2/S2 value is the ring/sun tooth ratio of the planetary gear set 930, and the R3/S3 value is the ring/sun tooth ratio of the planetary gear set 940. As can be determined from the truth table, the single ratio interchanges for the forward speed ratios are single transition interchanges. Also, the double step interchanges, such as $1^{st}$ to $3^{rd}$, $2^{nd}$ to $4^{th}$, $3^{rd}$ to $5^{th}$, $4^{th}$ to $6^{th}$, and $5^{th}$ to $7^{th}$, are single transition interchanges. FIG.

20 also describes the step ratio between adjacent ratios; for example, the numerical step between $1^{st}$ and $2^{nd}$ is 1.62.

Those skilled in the art will recognize that the numerical value of the reverse speed ratio is determined by the ring/sun tooth ratios of the planetary gear sets 930 and 940. The numerical value of the first forward speed ratio is determined by the ring/sun tooth ratio of the planetary gear set 920. The numerical value of the second forward speed ratio is determined by the ring/sun tooth ratios of the planetary gear sets 920 and 940. The numerical value of the third forward speed ratio is determined by the ring/sun tooth ratios of the planetary gear sets 920 and 930. The numerical value of the fourth forward speed ratio is one. The numerical value of the fifth forward speed ratio is determined by the ring/sun tooth ratios of the planetary gear sets 920, 930, and 940. The numerical value of the sixth forward speed ratio is determined by the ring/sun tooth ratios of the planetary gear sets 920 and 940. The numerical value of the seventh forward speed ratio is determined by the ring/sun tooth ratio of the planetary gear set 940.

Figures 21, 22:
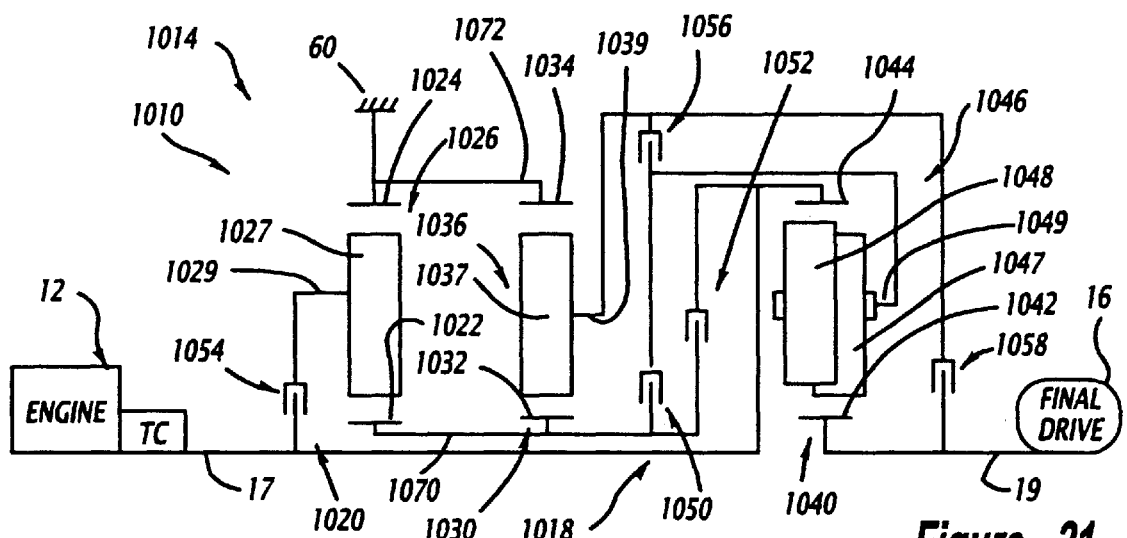
FIG. 21 is schematic representation of a powertrain incorporating another embodiment of the present invention.
FIG. 22 is a truth table and chart describing some of the operating characteristics of the powertrain depicted in FIG. 21.

A powertrain 1010, shown in FIG. 21, has the conventional engine and torque converter 12, a planetary transmission 1014, and the conventional final drive 16. The engine and torque converter 12 are drivingly connected with the transmission 1014 through an input shaft 17. The transmission is drivingly connected with the final drive 16 through an output shaft 19. The planetary transmission 1014 includes a planetary gear arrangement 1018 that includes a first planetary gear set 1020, a second planetary gear set 1030 and a third planetary gear set 1040, five torque transmitting mechanism 1050, 1052, 1054, 1056, and 1058 which are conventional selectively engageable fluid-operated devices, and two interconnecting members 1070 and 1072. The interconnecting member 1072 is continuously connected with the housing 60. The torque transmitting mechanisms 1050, 1052, 1054, 1056, and 1058 are rotating-type mechanisms which are commonly termed clutches.

The planetary gear set 1020 includes a sun gear member 1022, a ring gear member 1024, and a planet carrier assembly member 1026 that has a plurality of planet pinion gear members 1027 rotatably mounted on a planet carrier 1029 and disposed in meshing relation with the sun gear member 1022 and the ring gear member 1024. The planetary gear set 1030 includes a sun gear member 1032, a ring gear member 1034, and a planet carrier assembly member 1036 that has a plurality of planet pinion gears 1037 rotatably mounted on a planet carrier 1039 and disposed in meshing relation with the sun gear member 1032 and the ring gear member 1034. The planetary gear set 1040 has a sun gear member 1042, a ring gear member 1044, and a planet carrier assembly member 1046 that includes a plurality of intermeshing planet pinion gears 1047 1048 rotatably mounted on a planet carrier 1049 and disposed in meshing relation with the sun gear member 1042 and the ring gear member 1044, respectively.

The input shaft 17 is continuously interconnected with the ring gear member 1044 and the output shaft 19 is continuously interconnected with the sun gear member 1042. The sun gear member 1022 and the sun gear member 1032 are continuously interconnected through the interconnecting member 1070. The ring gear member 1024 and the ring gear member 1034 are continuously interconnected with the housing 60 through the interconnecting member 1072. Except for the intermeshing relationships described above, the planet carrier assembly member 1046, the planet carrier assembly member 1036, and the planet carrier assembly member 1026 are non-continuously interconnected with other members of the planetary gear sets 1020, 1030, and 1040, respectively. The torque transmitting mechanism 1050 selectively interconnects the planet carrier assembly member 1046 with the interconnecting member 1070. The torque transmitting mechanism 1052 selectively interconnects the input shaft 17 and the ring gear member 1044 with the interconnecting member 1070. The torque transmitting mechanism 1054 selectively interconnects the input shaft 17 and the ring gear member 1044 with the planet carrier assembly member 1026. The torque transmitting mechanism 1056 selectively interconnects the planet carrier assembly member 1046 with the planet carrier assembly member 1036. The torque transmitting mechanism 1058 selectively interconnects the planet carrier assembly member 1036 with the output shaft 19.

The truth table, shown in FIG. 22, defines the torque transmitting mechanism engagement required for each of the forward speed ratios and the reverse speed ratio. The numerical values for the ratios, shown in the truth table, have been determined using the ring/sun tooth ratios given in FIG. 22. The R1/S1 value is the ring/sun tooth ratio of the planetary gear set 1020, the R2/S2 value is the ring/sun tooth ratio of the planetary gear set 1030, and the R3/S3 value is the ring/sun tooth ratio of the planetary gear set 1040. As can be determined from the truth table, the single ratio interchanges for the forward speed ratios are single transition interchanges. Also, the double step interchanges, such as $1^{st}$ to $3^{rd}$, $2^{nd}$ to $4^{th}$, $3^{rd}$ to $5^{th}$, $4^{th}$ to $6^{th}$, and $5^{th}$ to $7^{th}$, are single transition interchanges. FIG. 22 also describes the step ratio between adjacent ratios; for example, the numerical step between $1^{st}$ and $2^{nd}$ is 1.63.

Those skilled in the art will recognize that the numerical value of the reverse speed ratio is determined by the ring/sun tooth ratios of the planetary gear sets 1020 and 1040. The numerical value of the first forward speed ratio is determined by the ring/sun tooth ratio of the planetary gear set 1030. The numerical value of the second forward speed ratio is determined by the ring/sun tooth ratios of the planetary gear sets 1030 and 1040. The numerical value of the third forward speed ratio is determined by the ring/sun tooth ratios of the planetary gear sets 1020 and 1030. The numerical value of the fourth forward speed ratio is one. The numerical value of the fifth forward speed ratio is determined by the ring/sun tooth ratios of the planetary gear sets 1020, 1030, and 1040. The numerical value of the sixth forward speed ratio is determined by the ring/sun tooth ratios of the planetary gear sets 1030 and 1040. The numerical value of the seventh forward speed ratio is determined by the ring/sun tooth ratio of the planetary gear set 1040.

Figures 23, 24:
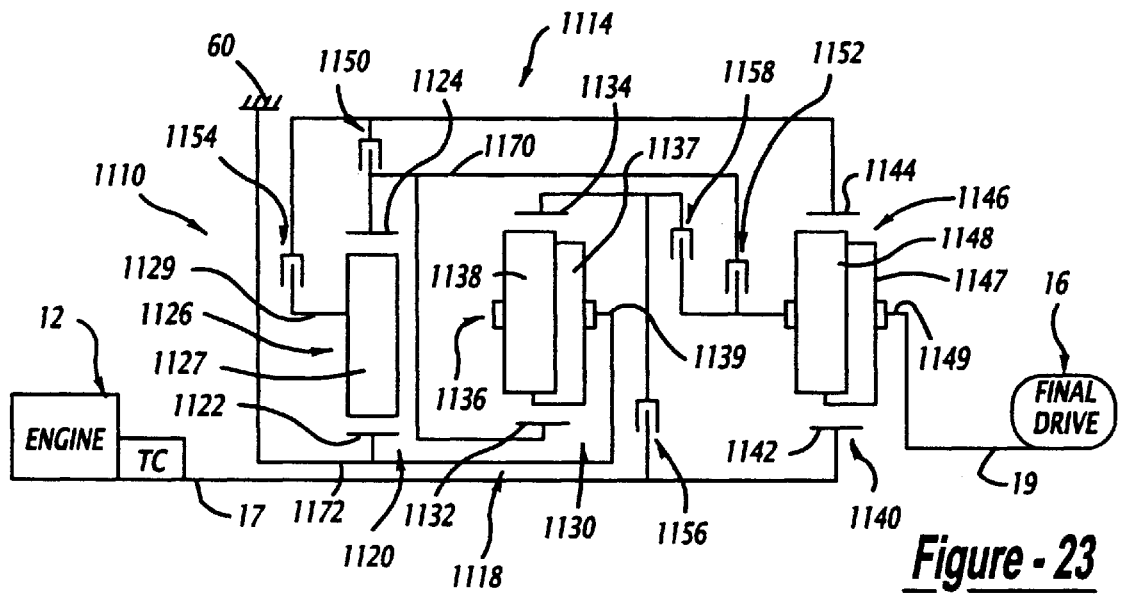
FIG. 23 is schematic representation of a powertrain incorporating another embodiment of the present invention.
FIG. 24 is a truth table and chart describing some of the operating characteristics of the powertrain depicted in FIG. 23.

A powertrain 1110, shown in FIG. 23, has the conventional engine and torque converter 12, a planetary transmission 1114, and the conventional final drive 16. The engine and torque converter 12 are drivingly connected with the transmission 1114 through an input shaft 17. The transmission is drivingly connected with the final drive 16 through an output shaft 19. The planetary transmission 1114 includes a planetary gear arrangement 1118 that includes a first planetary gear set 1120, a second planetary gear set 1130 and a third planetary gear set 1140, five torque transmitting mechanism 1150, 1152, 1154, 1156, and 1158 which are conventional selectively engageable fluid-operated devices, and two interconnecting members 1170 and 1172. The interconnecting member 1172 is continuously connected with the housing 60. The torque transmitting mechanisms 1150, 1152, 1154, 1156, and 1158 are rotating-type mechanisms which are commonly termed clutches. The torque transmitting mechanisms are selectively engaged in combinations of two, as set forth in FIG. 24, to provide six forward speed ratios and one reverse speed ratio.

The planetary gear set 1120 includes a sun gear member 1122, a ring gear member 1124, and a planet carrier assembly member 1126 that has a plurality of planet pinion gear members 1127 rotatably mounted on a planet carrier 1129 and disposed in meshing relation with the sun gear member 1122 and the ring gear member 1124. The planetary gear set 1130 includes a sun gear member 1132, a ring gear member 1134, and a planet carrier assembly member 1136 that has a plurality of intermeshing planet pinion gears 1137 and 1138 rotatably mounted on a planet carrier 1139 and disposed in meshing relation with the sun gear member 1132 and the ring gear member 1134, respectively. The planetary gear set 1140 has a sun gear member 1142, a ring gear member 1144, and a planet carrier assembly member 1146 that includes a plurality of intermeshing planet pinion gears 1147 and 1148 rotatably mounted on a planet carrier 1149 and disposed in meshing relation with the sun gear member 1142 and the ring gear member 1144, respectively.

The input shaft 17 is continuously interconnected with the sun gear member 1142 and the output shaft 19 is continuously interconnected with the planet carrier assembly member 1146. The ring gear member 1124 and the sun gear member 1132 are continuously interconnected through the interconnecting member 1170. The sun gear member 1122 and the planet carrier assembly member 1136 are continuously interconnected with the housing 60 through the interconnecting member 1172. Except for the intermeshing relationships defined above, the ring gear member 1144, the ring gear member 1134, and the planet carrier assembly member 1126 are non-continuously interconnected members of the respective planetary gear sets 1120, 1130, and 1140. The torque transmitting mechanism 1150 selectively interconnects the ring gear member 1144 with the interconnecting member 1170. The torque transmitting mechanism 1152 selectively interconnects the output shaft 19 and the planet carrier assembly member 1146 with the interconnecting member 1170. The torque transmitting mechanism 1154 selectively interconnects the ring gear member 1144 with the planet carrier assembly member 1126. The torque transmitting mechanism 1156 selectively interconnects the input shaft 17 and the sun gear member 1142 with the ring gear member 1134. The torque transmitting mechanism 1158 selectively interconnects the output shaft 19 and the planet carrier assembly member 1146 with the ring gear member 1134.

The truth table, shown in FIG. 24, defines the torque transmitting mechanism engagement required for each of the forward speed ratios and the reverse speed ratio. The numerical values for the ratios have been determined using the ring/sun tooth ratios given in FIG. 24. The R1/S1 value is the ring/sun tooth ratio of the planetary gear set 1120, the R2/S2 value is the ring/sun tooth ratio of the planetary gear set 1130, and the R3/S3 value is the ring/sun tooth ratio of the planetary gear set 1140. As can be determined from the truth table, the single ratio interchanges for the forward speed ratios are single transition interchanges. Also, the double step interchanges, such as $1^{st}$ to $3^{rd}$, $2^{nd}$ to $4^{th}$, $3^{rd}$ to $5^{th}$, and $4^{th}$ to $6^{th}$, are single transition interchanges. FIG. 24 also describes the step ratio between adjacent ratios; for example, the numerical step between $1^{st}$ and $2^{nd}$ is 1.86.

Those skilled in the art will recognize that the numerical value of the reverse speed ratio is determined by the ring/sun tooth ratio of the planetary gear set 1140. The numerical value of the first forward speed ratio is determined by the ring/sun tooth ratios of the planetary gear sets 1130 and 1140. The numerical value of the second forward speed ratio is determined by the ring/sun tooth ratios of the planetary gear sets 1120, 1130, and 1140. The numerical value of the third forward speed ratio is one. The numerical value of the fourth forward speed ratio is determined by the ring/sun tooth ratios of the planetary gear sets 1120, 1130, and 1140. The numerical value of the fifth forward speed ratio is determined by the ring/sun tooth ratio of the planetary gear set 1130. The numerical value of the sixth forward speed ratio is determined by the ring/sun tooth ratios of the planetary gear sets 1130 and 1140.

Figures 25, 26:
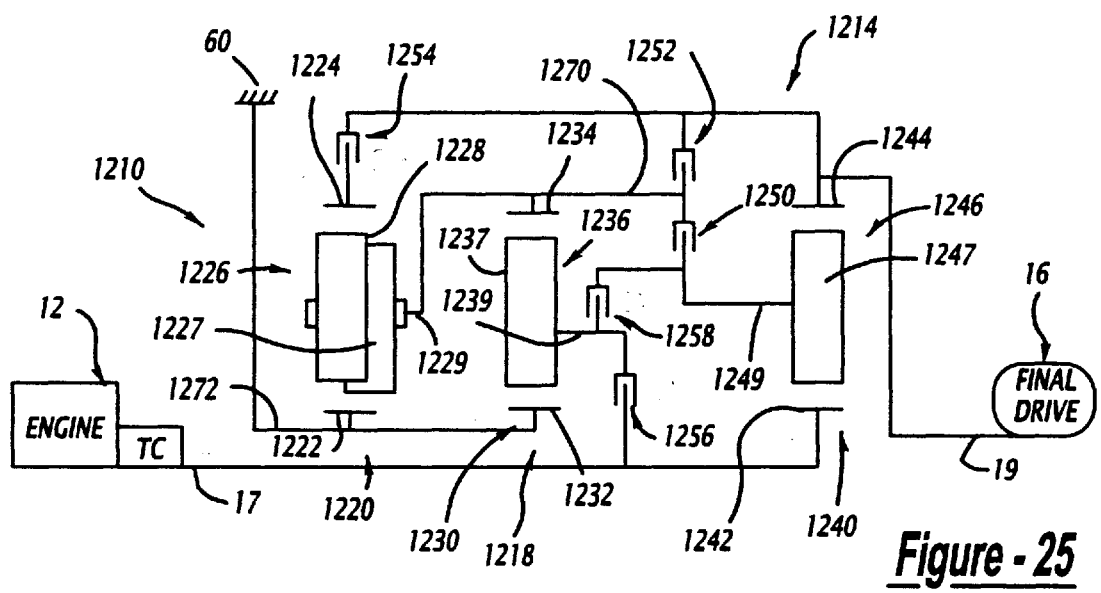
FIG. 25 is schematic representation of a powertrain incorporating another embodiment of the present invention.
FIG. 26 is a truth table and chart describing some of the operating characteristics of the powertrain depicted in FIG. 25.

A powertrain 1210, shown in FIG. 25, has the conventional engine and torque converter 12, a planetary transmission 1214, and the conventional final drive 16. The engine and torque converter 12 are drivingly connected with the transmission 1214 through an input shaft 17. The transmission is drivingly connected with the final drive 16 through an output shaft 19. The planetary transmission 1214 includes a planetary gear arrangement 1218 that includes a first planetary gear set 1220, a second planetary gear set 1230 and a third planetary gear set 1240, five torque transmitting mechanism 1250, 1252, 1254, 1256, and 1258 which are conventional selectively engageable fluid-operated devices, and two interconnecting members 1270 and 1272. The interconnecting member 1272 is continuously connected with the housing 60. The torque transmitting mechanisms 1250, 1252, 1254, 1256, and 1258 are rotating-type mechanisms which are commonly termed clutches. The torque transmitting mechanisms are selectively engaged in combinations of two, as described in the truth table of FIG. 26, to establish six forward speed ratios and one reverse speed ratio between the input shaft 17 and the output shaft 19.

The planetary gear set 1220 includes a sun gear member 1222, a ring gear member 1224, and a planet carrier assembly member 1226 that has a plurality of intermeshing planet pinion gear members 1227 and 1228 that are rotatably mounted on a planet carrier 1229 and disposed in meshing relation with the sun gear member 1222 and the ring gear member 1224, respectively. The planetary gear set 1230 includes a sun gear member 1232, a ring gear member 1234, and a planet carrier assembly member 1236 that has a plurality of planet pinion gears 1237 rotatably mounted on a planet carrier 1239 and disposed in meshing relation with the sun gear member 1232 and the ring gear member 1234. The planetary gear set 1240 has a sun gear member 1242, a ring gear member 1244, and a planet carrier assembly member 1246 that includes a plurality of planet pinion gears 1247 rotatably mounted on a planet carrier 1249 and disposed in meshing relation with the sun gear member 1242 and the ring gear member 1244.

The input shaft 17 is continuously connected with the sun gear member 1242 and the output shaft 19 is continuously interconnected with the ring gear member 1244. The planet carrier assembly member 1226 and the ring gear member 1234 are continuously interconnected through the interconnecting member 1270. The sun gear member 1222 and the sun gear member 1232 are continuously interconnected to the housing 60 through the interconnecting member 1272. The planet carrier assembly member 1246, the planet carrier assembly member 1236, and the ring gear member 1224, except for the meshing relationships defined above, are non-continuously interconnected members of the planetary gear sets 1220, 1230, 1240, respectively. The torque transmitting mechanism 1250 selectively interconnects the planet carrier assembly member 1246 with the interconnecting member 1270. The torque transmitting mechanism 1252 selectively interconnects the output shaft 19 and the ring gear member 1244 with the interconnecting member 1270. The torque transmitting mechanism 1254 selectively interconnects output shaft 19 and the ring gear member 1244 with the ring gear member 1224. The torque transmitting mechanism 1256 selectively interconnects the input shaft 17 and the sun gear member 1242 with the planet carrier assembly member 1236. The torque transmitting mechanism 1258 selectively interconnects the planet carrier assembly member 1246 with the planet carrier assembly member 1236.

The truth table, shown in FIG. 26, defines the torque transmitting mechanism engagement required for each of the forward speed ratios and the reverse speed ratio. The numerical values for the ratios have been determined using the ring/sun tooth ratios given in FIG. 26. The R1/S1 value is the ring/sun tooth ratio of the planetary gear set 1220, the R2/S2 value is the ring/sun tooth ratio of the planetary gear set 1230, and the R3/S3 value is the ring/sun tooth ratio of the planetary gear set 1240. As can be determined from the truth table, the single ratio interchanges for the forward speed ratios are single transition interchanges. Also, the double step interchanges, such as $1^{st}$ to $3^{rd}$, $2^{nd}$ to $4^{th}$, $3^{rd}$ to $5^{th}$, and $4^{th}$ to $6^{th}$, are single transition interchanges. FIG. 26 also describes the step ratio between adjacent ratios; for example, the numerical step between $1^{st}$ and $2^{nd}$ is 1.83.

Those skilled in the art will recognize that the numerical value of the reverse speed ratio is determined by the ring/sun tooth ratio of the planetary gear set 1240. The numerical value of the first forward speed ratio is determined by the ring/sun tooth ratios of the planetary gear sets 1220 and 1240. The numerical value of the second forward speed ratio is determined by the ring/sun tooth ratios of the planetary gear sets 1220, 1230, and 1240. The numerical value of the third forward speed ratio is determined by the ring/sun tooth ratios of the planetary gear sets 1220 and 1230. The numerical value of the fourth forward speed ratio is one. The numerical value of the fifth forward speed ratio is determined by the ring/sun tooth ratio of the planetary gear set 1230. The numerical value of the sixth forward speed ratio is determined by the ring/sun tooth ratios of the planetary gear sets 1230 and 1240.

In the above-described powertrains, particular members of the planetary gear set are described as being continuously interconnected by an interconnecting member which is connected with the housing 60. Those skilled in the art will be aware that these particular members in many instances, such as shown in FIGS. 1, 5, 9, and 13, for example, could be connected directly with the housing or components thereof such that the housing itself would be the interconnecting member.

What is claimed is:

1. A multi-speed power transmission comprising:
    an input shaft;
    an output shaft;
    a planetary gear arrangement including a first planetary gearset, a second planetary gearset, and a third planetary gearset, each planetary gearset having first, second, and third members, said first member of said third planetary gearset being continuously interconnected with said input shaft, said second member of said third planetary gearset being continuously interconnected with said output shaft, said first members of said first and second planetary gearsets being continuously interconnected through an interconnecting member, said second members of said first and second planetary gearsets being continuously connected with a stationary member of the transmission;
    five torque transmitting mechanisms being operable in combinations of two to establish at least six forward speed ratios and one reverse ratio between said input shaft and said output shaft wherein:
    a first of said torque-transmitting mechanisms selectively interconnecting said input shaft with said interconnecting member, a second of said torque-transmitting mechanisms selectively connecting said third member of said first planetary gearset with said interconnecting member, a third of said torque-transmitting mechanisms selectively interconnecting said third member of said first planetary gearset with said output shaft, a fourth of said torque-transmitting mechanisms selectively interconnecting said third member of said second planetary gearset with said third member of said third planetary gearset and a fifth of said torque-transmitting mechanisms selectively interconnecting said third member of said second planetary gearset, or
    said first torque-transmitting mechanism selectively interconnecting said input shaft, said second torque-transmitting mechanism selectively interconnecting said third member of said third planetary gearset with said interconnecting member, said third torque-transmitting mechanism selectively interconnecting said third member of said first planetary gearset with said output shaft, said fourth torque-transmitting mechanism selectively interconnectiing said third member of said second planetary gearset with said third member of said third planetary gearset, and said fifth torque-transmitting mechanism selectively interconnecting said third member of said second planetary gearset with said output shaft, or
    said first torque-transmitting mechanism selectively interconnecting said third member of said third planetary gearset with said interconnecting member, said second torque-transmitting mechanism selectively interconnecting said input shaft with said third member of said first planetary gearset, said third torque-transmitting mechanism selectively interconnecting said third member of said first planetary gearset with said third member of said third planetary gearset, said fourth torque-transmitting mechanism selectively interconnecting said third member of said first planetary gearset with said output shaft, and said fifth torque-transmitting mechanism selectively interconnecting said third member of said second planetary gearset with said input shaft, or
    said first torque-transmitting mechanism selectively interconnecting said interconnecting member with said output shaft, said second torque-transmitting mechanism selectively interconnecting said input shaft with said interconnecting member, said third torque-transmitting mechanism selectively interconnecting said third member of said third planetary gearset with said interconnecting member, said fourth torque-transmitting mechanism selectively interconnecting said input shaft with said third member of said first planetary gearset, and said fifth torque-transmitting mechanism selectively interconnecting said third member of said second planetary gearset with said third member of said third planetary gearset, or
    said first torque-transmitting mechanism selectively interconnecting said third member of said third planetary gearset with said interconnecting member, said second torque-transmitting mechanism selectively interconnecting said third member of said first planetary gearset with said input shaft, said third torque-transmitting mechanism selectively interconnecting said third member of said second planetary gearset with said third member of said third planetary gearset, said fourth torque-transmitting mechanism selectively interconnecting said input shaft with said third member of said second planetary gearset, and said fifth torque-transmitting mechanism selectively interconnecting said third member of said second planetary gearset with said output shaft, or said first torque-transmittting mechanism selectively interconnecting said input shaft with said interconnecting member, said second torque-transmitting mechanism selectively interconnecting said third member of said third member of said third planetary gearset, said third torque-transmitting mechanism selectively interconnecting said input shaft with said third member of said first planetary gearset, said fourth torque-transmitting mechanism selectively interconnecting said third member of said first planetary gearset with said output shaft, and said fifth torque-transmitting mechanism selectively interconnecting said third member of said second planetary gearset with said third member of said third planetary gearset, or said first torque-transmitting mechanism selectively interconnecting said input shaft with said interconnecting member, said second torque-transmitting mechanism selectively interconnecting said third member of said third planetary gearset with said interconnecting member, said third torque-transmitting mechanism selectively interconnecting said third member of said first planetary gearset with said third member of said third planetary gearset, said fourth torque-transmitting mechanism selectively interconnecting said third member of said first planetary gearset with said output shaft, and said fifth torque-transmitting mechanism selectively interconnecting said third member of said second planetary gearset with said third member of said third planetary gearset, or said first torque-transmitting mechanism selectively interconnecting said input shaft with said interconnecting member, said second torque-transmitting mechanism selectively interconnecting said third member of said first planetary gearset with said output shaft, said third torque-transmitting mechanism selectively interconnecting said third member of said first planetary gearset with said third member of said third planetary gearset, said fourth torque-transmitting mechanism selectively interconnecting said third member of said second planetary gearset with said input shaft, and said fifth torque-transmitting mechanism selectively interconnecting said third member of said second planetary gearset with said third member of said third planetary gearset, or said first torque-transmitting mechanism selectively interconnecting said third member of said third planetary gearset with said interconnecting member, said second torque-transmitting mechanism selectively interconnecting said input shaft with said interconnecting member, said third torque-transmitting mechanism selectively interconnecting said third member of said first planetary gearset with said third member of said third planetary gearset, said fourth torque-transmitting mechanism selectively interconnecting said input shaft with said third member of said first planetary gearset, and said fifth torque-transmitting mechanism selectively interconnecting said third member of said second planetary gearset with said output shaft, or said first torque-transmitting mechanism selectively interconnecting said third member of said third planetary gearset with said interconnecting member, said second torque-transmitting mechanism selectively interconnecting said input shaft with said interconnecting member, said third torque-transmitting mechanism selectively interconnecting said third member of said first planetary gearset with said output shaft, said fourth torque-transmitting mechanism selectively interconnecting said third member of said first planetary gearset with said output shaft, and said fifth torque-transmitting mechanism selectively interconnecting said input shaft with said third member of said second planetary gearset, or said first torque-transmitting mechanism selectively interconnecting said third member of said third planetary gearset with said interconnecting member, said second torque-transmitting mechanism selectively interconnecting said input shaft with said interconnecting member, said third torque-transmitting mechanism selectively interconnecting said input shaft with said third member of said first planetary gearset, said fourth torque-transmitting mechanism selectively interconnecting said third member of said second planetary gearset with said third member of said third planetary gearset, and said fifth torque-transmitting mechanism selectively interconnecting said third member of said second planetary gearset with said output shaft, or said first torque-transmitting mechanism selectively interconnecting said third member of said third planetary gearset with said interconnecting member, said second torque-transmitting mechanism selectively interconnecting said interconnecting member with said output shaft, said third torque-transmitting mechanism selectively interconnecting said third member of said first planetary gearset with said third member of said third planetary gearset, said fourth torque-transmitting mechanism selectively interconnecting said input shaft with said third member of said second planetary gearset, and said fifth torque-transmitting mechanism selectively interconnecting said third member of said second planetary gearset with said output shaft, or said first torque-transmitting mechanism selectively interconnecting said third member of said third planetary gearset with said interconnecting member, said second torque-transmitting mechanism selectively interconnecting said interconnecting member with said output shaft, said third torque-transmitting mechanism selectively interconnecting said third member of said first planetary gearset with said output shaft, said fourth torque-transmitting mechanism selectively interconnecting said input shaft with said third member of said second planetary gearset, and said fifth torque-transmitting mechanism selectively interconnecting said third member of said second planetary gearset with said third member of said third planetary gearset.

2. The multi-speed transmission defined in claim 1 further wherein:

said torque transmitting mechanisms are each of the rotating-type clutch mechanisms.

3. The multi-speed transmission defined in claim 1 further wherein:

said first, second and third members of said first second and third planetary gearsets are one of a sun gear member, a ring gear member, and a planet carrier assembly member.

4. A multi-speed power transmission having a plurality of planetary transmission members, comprising:

an input shaft;

an output shaft;

a transmission housing;

a planetary gear arrangement including a first planetary gearset, a second planetary gearset, and a third planetary gearset, each planetary gearset having first, second and third members comprised of either a sun gear member, a ring gear member or a planet carrier assembly member, said first members of said first and second planetary gearsets being continuously interconnected through an interconnecting member, said second members of said second and third planetary gearsets being continuously interconnected with a stationary member of the transmission;

said input shaft being continuously interconnected with at least one member of said planetary gearsets, and said output shaft being continuously interconnected with another member of said planetary gearsets that is not continuously connected with said input shaft;

five selectively engageable torque transmitting mechanisms connecting members of said planetary gearsets between said input shaft, and said output shaft, said five torque transmitting mechanisms being selectively engageable in combinations of two to establish at least six forward speed ratios and one reverse speed ratio between said input shaft and said output shaft.

5. The multi-speed transmissions defined in claim 4 further wherein:

each of said torque transmitting mechanisms is a rotating clutch mechanism; and each of said first, second and third members of said first, second and third planetary gearsets is either a sun gear member, a ring gear member, or a planet carrier assembly member.

6. The multi-speed transmission defined in claim 5 further wherein:

each of said planet carrier assembly members includes a plurality of pinion gear members rotatably mounted on a carrier and meshing with said sun gear member and said ring gear member of the respective planetary gearset.

7. The multi-speed transmission defined in claim 5 further wherein:

each of said planetary gearsets may be of the simple planetary type or one or more may be of the compound planetary type.

\* \* \* \* \*